(12) United States Patent
Awadallah-F et al.

(10) Patent No.: US 11,975,973 B2
(45) Date of Patent: May 7, 2024

(54) THERMALLY CROSSLINKED GELS

(71) Applicant: QATAR UNIVERSITY, Doha (QA)

(72) Inventors: Ahmed Awadallah-F, Doha (QA); Shaheen A. Al-Muhtaseb, Doha (QA)

(73) Assignee: QATAR UNIVERSITY, Doha (QA)

( * ) Notice: Subject to any disclaimer, the term of this patent is extended or adjusted under 35 U.S.C. 154(b) by 650 days.

(21) Appl. No.: 16/850,619

(22) Filed: Apr. 16, 2020

(65) Prior Publication Data
US 2021/0323830 A1 Oct. 21, 2021

(51) Int. Cl.
*C01B 32/05* (2017.01)
*C01B 32/318* (2017.01)
*C01B 32/336* (2017.01)
*C08J 3/075* (2006.01)

(52) U.S. Cl.
CPC ............ *C01B 32/318* (2017.08); *C01B 32/05* (2017.08); *C01B 32/336* (2017.08); *C08J 3/075* (2013.01); *C01P 2004/03* (2013.01); *C01P 2006/12* (2013.01); *C01P 2006/14* (2013.01); *C01P 2006/16* (2013.01); *C08J 2361/10* (2013.01)

(58) Field of Classification Search
CPC ................................. C01B 32/05; C08J 3/075
See application file for complete search history.

(56) References Cited

PUBLICATIONS

Eka Mulya Alamsyah et al., "Bondability of Tropical Fast-growing Tree Species III: Curing Behavior of Resorcinol Formaldehyde Resin Adhesive at Room Temperature and Effects of Extractives of Acacia Mangium Wood on Bonding", J Wood Sci (2008) 54:208-213, DOI: 10.1007/s10086-007-0945-1, The Japan Wood Research Society 2008.
B. Babic et al., "Characterization of Carbon Cryogel Synthesized by sol gel Polycondensation and Freeze-Drying", Carbon 42 (2204), pp. 2617-2624, The Vinca Institute of Nuclear Sciences, P.O. Box 522, 11001 Belgrade, Serbia and Montenegro, University of Belgrade, Karnegijeva 4, 11120 Belgrade, Serbia and Montenegro, www.sciencedirect.com, www.elsevier.com/locate/carbon, doi: 10.1016/j.carbon.2004.05.046.
D. Banerjee, et al., "Recovery of Purified Radiocesium From Acidic Solution Using Ammonium Molybdophosphate and Resorcinol Formaldehyde Polycondensate Resin", Desalination 232 (2008), pp. 172-180, www.sciencedirect.com, www.elsevier.com/locate/desal, doi: 10.1016/j.desal.2007.12.015.
R. Brandt et al., "Acetic-acid-catalyzed and Subcritically Dried Carbon Aerogels With a Nanometer-sized Structure and a Wide Density Range", Journal of Non-Crystalline Solids 350 (2004), pp. 131-135, www.sciencedirect.com, www.elsevier.com/locate/jnoncrysol, doi:10.1016/j.jnoncrysol.2004.06.039.
P.J.M. Carrott et al., "Use of n-nonane pre-adsorption for the Determination of Micropore Volume of Activated Carbon Aerogels", Carbon 45 (2007), pp. 1310-1313, www.sciencedirect.com, www.elsevier.com/locate/carbon, doi:10.1016/j.carbon.2007.01.008.
T. Chaijitrsakool et al., "Effects of Pore Characters of Mesoporous Resorcinol-formaldehyde Carbon Gels on Enzyme Immobilization", Journal of Molecular Catalysis B. Enzymatic 55 (2008), pp. 137-141, www.elsevier.com/locate/molcatb, doi:10.1016/j.molcatb.2008.02.008.
N. Cohaut et al., "The Porous Network in Carbon Aerogels Investigated by Small Angle Neutron Scattering", Carbon 45 (2007), pp. 1185-1192, www.sciencedirect.com, www.elsevier.com/locate/carbon, doi:10.1016/j.carbon.2007.02.020.
Orsolya Czakkel et al., "Influence of Drying on the Morphology of Resorcinol Formaldehyde-based Carbon Gels", Microporous and Mesoporous Materials 86 (2005), pp. 124-133, www.sciencedirect.com, www.elsevier.com/locate/micromeso, doi:10.1016/j.micromeso.2005.07.021.
D. Fairen-Jimenez et al., "Porosity and Surface Area of Monolithic Carbon Aerogels Prepared Using Alkaline Carbonates and Organic Acids as Polymerization Catalysts", Carbon 44 (2006), pp. 2301-2307, www.sciencedirect.com, www.elsevier.com/locate/carbon, universidad de Granada, 18071 Granada, Spain, doi:10.1016/j.carbon.2006.02.021.
Baizeng Fang et al, "A Modified Activated Carbon Aerogel for High-energy Storage in Electric Double Layer Capacitors", Journal of Power Sources 163 (2006), pp. 616-622, www.sciencedirect.com, www.elsevier.com/locate/jpowsour, Graz University of Technology, Stremayrgasse 16/III, A-8010 Graz, Austria.
Aaron Feaver et al., "Activated Carbon Cryogels for Low Pressure Methane Storage", Carbon 44 (2006), pp. 587-610, University of Washington, Seattle, WA 98195-2120, doi:10.1016/j.carbon.2005.10.004.
Daisuke Fujikawa et al., "Shape-controlled Synthesis of nanocarbons From Resorcinol Formaldehyde Nanopolymers Using Surfactant-templated Vesicular Assemblies", Carbon 45 (2007), pp. 1289-1295, www.sciencedirect.com, www.elsevier.com/locate/carbon, Miyazaki University, Miyazaki, Japan, doi:10.1016/j.carbon.2007.01.020.
Mayur M. Gaikwad et al., "Enhanced Catalytic Graphitization of Resorcinol Formaldehyde Derived Carbon Xerogel to Improve its Anodic Performance for Lithium Ion Battery", Materials Today Communications, 11 pages, www.sciencedirect.com, www.elsevier.com/locate/mtcomm, doi.org/10.1016/j.mtcomm.2019.100569.

(Continued)

*Primary Examiner* — Stuart L Hendrickson
(74) *Attorney, Agent, or Firm* — SQUIRE PATTON BOGGS (US) LLP

(57) ABSTRACT

A method of synthesizing a gel may include dissolving resorcinol and formaldehyde to form a homogenous medium. The method may also include subjecting the medium to nitrogen gas flow. The method may further include subjecting the medium to a vacuum procedure at a room temperature. Thus, the medium is subjected to the melting temperature of resorcinol. In addition, the method may include cooling the gel and subjecting the formed gel to the vacuum procedure at the temperature lower than the melting temperature of resorcinol.

9 Claims, 17 Drawing Sheets

(56) References Cited

PUBLICATIONS

Joachim Gross et al., "Elastic Properties of Crosslinked Resorcinol-Formaldehyde Gels and Aerogels", Journal of Non-Crystalline Solids 211 (1997), pp. 132-142, Lawrence Livermore National Laboratory, Livermore, CA 94550.
Toshihide Horikawa et al., "Influence of Surface-active Agents on Pore Characteristics of the Generated Spherical Resorcinol Formaldehyde Based Carbon Aerogels", Carboon 42 (2204), pp. 2683-2689, www.sciencedirect.com, www.elsevier.com/locate/carbon, Kansai University, Osaka, Japan, doi:10.1016/j.carbon.2004.06.015.
Toshihide Horikawa et al., "Size Control and Characterization of Spherical Carbon Aerogel Particles From Resorcinol Formaldehyde Resin", Carbon 42 (2004), pp. 169-175, www.sciencedirect.com, www.elsevier.com/locate/carbon, Kansai University, Osaka, Japan, doi:10.1016/j.carbon.2003.10.007.
Toshihide Horikawa et al., "Contorllability of Pore Characteristics of Resorcinol Formaldehyde Carbon Aerogel", Carbon 42 (2004), pp. 1625-1633, www.sciencedirect.com, www.elsevier.com/locate/carbon, Kansai University, Osaka, Japan, doi:10/1016/j.carbon.2004.02.016.
Lawrence W. Hrubesh, "Section 8. Applications, Aerogel Applications", Journal of Non-Crystalline Solids 225 (1998), pp. 335-342, Lawrence Livermore National Laboratory, Livermore, CA 94550, 8 pages.
Sung-Woo Hwang et al., "Synthesis and Characterization of Tin Oxide/Carbon Aerogel Composite Electrodes for Electrochemical Supercapacitors", Journal of Power Sources 172 (2007), pp. 451-459, www.sciencedirect.com, www.elsevier.com/locate/jpowsour, doi:10.1016/j.jpowsour.2007/07.061.
Sung-Woo Hwang et al., "Capacitance Control of Carbon Aerogel Electrodes", Journal of Non-Crystalline Solids 347 (2004), pp. 238-245, www.sciencedirect.com, www.elsevier.com/locate/jnoncrysol, Yonsei University, Seoul, Republic of Korea, doi:10.1016/j.jnoncrysol.2004.07.075.
Nathalie Job et al, "Synthesis of Transition Metal-doped Carbon Xerogels by Solubilization of Metal Salts in Resorcinol Formaldehyde Aqueous Solution", Carbon 42 (2004), pp. 3217-3227, Université de Liège, Belgium, www.sciencedirect.com, wwwlelsevier.com/locate/carbon, doi:10.1016/j.carbon.2004.08.013.
Nathalie Job et al., "Porous Carbon Xerogels with Texture Tailored by pH Control During Sol Gel Process", Carbon 42 (2004), pp. 619-628, www.sciencedirect.com, www.elsevier.com/locate/carbon, Université de Liège, Belgium, doi:10.1016/j.carbon.2003.12.072.
Nathalie Job et al., "Synthesis Optimization of Organic Xerogels Produced From Convective Air-drying of Resorcinol Formaldehyde Gels", Journal of Non-Crystalline Solids 352 (2006), pp. 24-34, www.sciencedirect.com, www.elsevier.com/locate/jnoncrysol, Université de Liège, Belgium, doi:10.1016/j.jnoncrysol.2005.11.024.
Nathalie Job et al., "Towards the Production of Carbon Xerogel Monoliths by Optimizing Convective Drying Conditions", Carbon 44 (2006), pp. 2534-2542, www.sciencedirect.com, www.elsevier.com/locate/carbon, Université de Liège, Belgium, doi:10.1016/j.carbon.2006.04.031.
Nathalie Job et al., "Rheological Determination of the Sol-gel Transition During the Aqueous Synthesis of Resorcinol-Formaldehyde Resins", Colloids and Surfaces A: Physiochem. Eng. Aspects 293 (2007), pp. 224-228, www.sciencedirect.com, www.elsevier.com/locate/colsurfa, Université de Liège, Belgium, doi:10.1016/j.colsurfa.2006.07.037.
Nathalie Job et al., "Carbon Xerogels as Catalyst Supports for PEM Fuel Cell Cathode", Energy Conversion and Management, www.sciencedirect.com, www.elsevier.com/locate/enconman, Université de Liège, Belgium, doi:10.1016/j.enconman.2008.03.025.
Kyung Yeon Kang et al., "Enhanced Electrochemical Capacitance of Nitrogen-doped Carbon Gels Synthesized by Microwave-assisted Polymerization of Resorcinol and Formaldehyde", www.sciencedirect.com, www.elsevier.com/locate/elecom, Pohang University of Science and Technology, Pohang, Republic of Korea, doi:10.1016/j.elecom.2008.05.029.
Sho Kataoka et al., "Synthesis of Ordered Mesoporous Carbon Thin Films at Various Temperatures in Vapor Infiltration Method", Carbon 46 (2008), pp. 1358-1367, ScienceDirect, www.sciencedirect.com, www.elsevier.com/locate/carbon, National Institute of Advanced Industrial Science and Technology (AIST), Ibaraki, Japan, doi:10.1016/j.carbon.2008.05.014.
Sumin Kim et al., "Fast Curing PF Resin Mixed with Various Resins and Accelerators for Building Composite Materials", Constructions and Building Materials 22 (2008), pp. 2141-2146, www.sciencedirect.com, www.elsevier.com/locate/conbuildmat, Soongsil University, Seoul, South Korea, doi:10.1016/j.conbuildmat.2007.07.007.
R. Kocklenberg et al., "Texture Control of Freeze-dried Resorcinol-formaldehyde Gels", Journal of Non-Crystalline Solids 225 (1998), pp. 8-13, Laboratoire de Gènie Chimique, Liège University, Belgium.
E. Lafuente et al., "The Influence of Single-walled Carbon Nanotube Functionalization on the Electronic Properties of Their Polyaniline Composites", Carbon 46 (2008), pp. 1909-1917, www.sciencedirect.com, www.elsevier.com/locate/carbon, Instituto de Carboquímica, CSIC, Zaragoza, Spain, doi:10.1016/j.carbon.2008.07.039.
Wen-Jau Lee et al., "Properties of Resorcinol Tannin Formaldehyde Copolymer Resins Prepared From the Bark Extracts of Taiwan Acacia and China Fir", Bioresource Technology 97 (2006), pp. 257-264, www.sciencedirect.com, National Chung-Hsing University, Taichung, Taiwan, doi:10.1016/j.biortech.2005.02.009.
A. Léonard et al., "Evolution of Mechanical Properties and Final Textural Properties of Resorcinol Formaldehyde Xerogels During Ambient Air Drying", Journal of Non-Crystalline Solids 354 (2008), pp. 831-838, www.sciencedirect.com, www.elsevier.com/locate/jnoncrysol, Université de Liège, Belgium, doi:10.1016/j.inoncrysol.2007.08.024.
Angélique Léonard et al., "Suitability of Convective Air Drying for the Production of Porous Resorcinol Formaldehyde and Carbon Xerogels", Carbon 43 (2005), pp. 1778-1814, Université de Liège, Belgium, doi:10.1016/j.carbon.2005.02.016.
Jun Li et al, "Studies on Preparation and Performances of Carbon Aerogel Electrodes for the Application of Supercapacitor", Journal of Power Sources 158 (2006), pp. 784-788, www.sciencedirect.com, wwwl.elsevier.com/locate/jpowsour, Xiangtan University, Human, China, doi:10.1016/j.jpowsour.2005.09.045.
Changhai Liang et al., "Resorcinol-formaldehyde Aerogels Prepared by Supercritical Acetone Drying", Journal of Non-Crystalline Solids 271 (2000), pp. 167-170, www.elsevier.com/locate/jnoncrysol, Dalian University of Technology, Dalian, People's Republic of China.
Donghui Long et al., "Molecular Design of Polymer Precursors for Controlling Microstructure of Organic and Carbon Aerogels", Journal of Non-Crystalline Solids 355 (2009), pp. 1252-1258, www.elsevier.com/locate/jnoncrysol, East China University of Science and Technology, Shanghai, China, doi:10.1016/j.jnoncrysol.2009.04.039.
Dong-hui Long et al., "Preparation and Microstructure Control of Carbon Aerogels Produced Using m-cresol Mediated Sol-gel Polymerization of Phenol and Furfural", New Carbon Materials, vol. 23, Issue 2, Mar. 2008, pp. 165-170, www.sciencedirect.com, East China University of Science and Technology, Shanghai, China.
N. Mahata et al., "Tuning of Texture and Surface Chemistry of Carbon Xerogels", Journal of Colloid and Interface Science 324 (2008), pp. 150-155, www.elsevier.com/locate/jcis, Universidade do Porto, Porto, Portugal, doi:10.1016/j.jcis.2008.05.006.
N. Mahata et al., "Anchoring of a [Mn(salen)Cl]Complex onto Mesoporous Carbon Xerogels", Journal of Colloid and Interface Science 311 (2007), pp. 152-158, www.sciencedirect.com, www.elsevier.com/locate/jcis, Universidade do Porto, Porto, Portugal, doi:10.1016/j.jcis.2007.02.080.
B. Mathieu et al., "Freeze-dried Resorcinol-formaldehyde Gels", Journal of Non-Crystalline Solids 212 (1997), pp. 250-261, Liège University, Liège, Belgium.

(56) References Cited

PUBLICATIONS

C. Moreno-Castilla et al., "Carbon Aerogels for Catalysis Applications: An Overview", Carbon 43 (2005), pp. 455-465, www.sciencedirect, www.elsevier.com/locate/carbon, doi:10.1016/j.carbon.2004.10.022.

Samuel E. Muehlemann et al., "Facile Synthesis of Resorcinol-melamine-formaldehyde Based Carbon Xerogel", Materials Today: Proceedings 5 (2018), pp. 13776-13784, www.sciencedirect.com, www.materialstoday.com/proceedings, Empa, Swiss Federal Laboratories for Materials Science and Technology, Laboratory, Dübendorf, Switzerland.

Shin R. Mukai et al., "Morphology of Resorcinol Formaldehyde Gels Obtained Through Ice-templating", Carbon 43 (2005), pp. 1557-1583, Kyoto University, Kyoto, Japan, doi:10.1016/j.carbon.2004.12.029.

Hirotomo Nishihara et al., "Preparation of Resorcinol Farmaldehyde Carbon Cryogel Microhoneycombs", Carbon 42 (2004), pp. 885-901, Kyoto University, Kyoto, Japan, doi:10.1016/j.carbon.2004.01.075.

Norikazu Nishiyama et al., "Microporous Carbons Prepared from Cationic Surfactant Resorcinol/Formaldehyde Composites", Carbon 43 (2005), pp. 269-274, www.sciencedirect.com, www.elsevier.com/carbon, Osaka University, Osaka, Japan, doi:10.1016/j.carbon.2004.09.009.

R.W. Pekala et al., "New Organic Aerogels Based Upon a Phenolic-furfural Reaction", Journal of Non-Crystalline Solids 188 (1995), pp. 34-40, Lawrence Livermore National Laboratory, Livermore, CA.

R. Petričević et al., "Skin Formation on RF Aerogel Sheets", Journal of Non-Crystalline Solids 285 (2001), pp. 272-276, www.elsevier.com/locate/jnoncrysol, Universität Würzburg, Würzburg, Germany.

R. Petričević et al., "Structure of Carbon Aerogels Near the Gelation Limit of the Resorcinol-formaldehyde Precursor", Journal of Non-Crystalline Solids 225 (1998), pp. 41-45, Universität Würzburg, Würzburg, Germany.

G. Reichenauer et al., "Microporosity in Carbon Aerogels", Journal of Non-Crystalline Solids 225 (1998), pp. 210-214, Würzburg, Germany.

R. Saliger et al., "High Surface Area Carbon Aerogels for Supercapacitors", Journal of Non-Crystalline Solids 225 (1998), pp. 81-85, University of Würzburg, Würzburg, Germany.

R. Saliger et al., "Carbon Aerogels from Dilute Catalysis of Resorcinol with Formaldehyde", Journal of Non-Crystalline Solids 221 (1997), pp. 144-150, Physikalisches Institut der Universität Würzburg, Würzburg, Germany.

Carl D. Saquing et al., "Investigation of the Supercritical Desposition of Platinum Nanoparticles into Carbon Aerogels", Microporous and Mesoporous Materials 80 (2005), pp. 11-23, www.sciencedirect.com, www.elsevier.com/locate/micromeso, doi:10.1016/j.micromeso.2004.11.019.

Dale W. Schaefer, et al., "Origin of Porosity in Resorcinol-formaldehyde Aerogels", Journal of Non-Crystalline Solids 186 (1995), pp. 159-167, Sandia National Laboratories, Albuquerque, NM.

C. Scherdel et al., "Spherical Porous Carbon Particles Derived From Suspensions and Sediments of Resorcinol-formaldehyde Particles", Carbon 47 (2009), pp. 2244-2252, www.sciencedirect.com, www.elsevier.com/locate/carbon, Bavarian Center for Applied Energy Research, Würzburg, Germany, doi:10.1016/j.carbon.2009.04.015.

C. Schmitt et al., "Carbon Cloth-reinforced and Activated Aerogel Films for Supercapacitors", Journal of Non-Crystalline Solids 285 (2001), pp. 277-282, www.elsevier.com/locate/jnoncrysol, Universität Würzburg, Würzburg, Germany.

Saghar Sepehri et al., "Enhanced Electrochemical and Structural Properties of Carbon Cryogels by Surface Chemistry Alteration with Boron and Nitrogen", Carbon 47 (2009), pp. 1436-1443, www.elsevier.com/locate/carbon, www.sciencedirect.com, www.elsevier.com/locate/carbon, doi:10.1016/j.carbon.2009.01.034.

S.A. Shady, Selectivity of Cesium From Fission Radionuclides Using Resorcinol-formaldehyde and Zirconyl-molybdopyrophosphate as ion-exchangers, Journal of Hazardous Materials 167 (2009), pp. 947-952, www.elsevier.com/locate/jhazmat, Hot Laboratories Center, Cairo, Egypt, doi:10.1016/j.jhazmat.2009.01.084.

Chandra S. Sharma et al., "Synthesis of Carbon Xerogel Particles and Fractal-like Structures", Chemical Engineering Science 64 (2009), pp. 1536-1543, www.elsevier.com/locate/ces, Indian Institute of Technology, Kanpur, India, doi:10.1016/j.ces.2008.12.013.

A. Solhy et al., "MWCNT Activation and its Influence on the Catalytic Performance of Pt/MWCNT Catalysts for Selective Hydrogenation", Carbon 46 (2008), pp. 1194-1207, www.sciencedirect.com, www.elsevier.com/locate/carbon, Laboratoire de Chimie de Coordination, Toulouse University, Toulouse Cedex, France, doi:10.1016/j.carbon.2008.04.018.

Daisuke Tashima et al., "Performance of Electric Double Layer Capacitors Using Nanocarbons Produced from Nanoparticles of Resorcinol-formaldehyde Polymers", Materials Chemistry and Physics 115 (2009), pp. 69-73, www.elsevier.com/locate/matchemphys, University of Miyazaki, Japan, doi:10/1016/j.matchemphys.2008.11.017.

H.Y. Tian et al., "Enhanced Hydrogen Storage Capacity in Carbon Aerogels Treated with KOH", Carbon 47 (2009), pp. 2112-2142, Curtin University of Technology, Perth, WA, Australia, doi:10/1016/j.carbon.2009.03.063.

Nattaporn Tonanon et al., "Preparation of Resorcinol Formaldehyde (RF) Carbon Gels: Use of Ultrasonic Irradiation Followed by Microwave Drying", Journal of Non-Crystalline Solids 352 (2006), pp. 5683-5686, www.sciencedirect.com, www.elsevier.com/locate/jnoncrysol, Chulalongkorn University, Thailand, doi:10.1016/j.jnoncrysol.2006.09.017.

N. Tonanon et al., "Influence of Surfactants on Porous Properties of Carbon Cryogels Prepared by Sol-gel Polycondensation of Resorcinol and Formaldehyde", Carbon 41 (2003), pp. 2981-2990, Chulalongkorn University, Bangkok, Thailand, doi:10.1016/S0008-6223(03)00422-6.

Z.B. Wen et al., "An Activated Carbon With High Capacitance From Carbonization of a Resorcinol Formaldehyde Resin", Electrochemistry Communications 11 (2009), pp. 715-718, www.elsevier.com/locate/elecom, Fudan University, Shanghai, China, doi:10.1016/j.elecom.2009.01.015.

Dingcai Wu et al., "Low-density Organic and Carbon Aerogels From the Sol Gel Polymerization of Phenol with Formaldehyde", Journal of Non-Crystalline Solids 351 (2005), pp. 915-921, www.sciencedirect.com, www.elsevier.com/locate/jnoncrysol, Zongshan University, Guangzhou, PR China, doi:10.1016/j.jnoncrysol.2005.02.008.

Dingcai Wu et al., "Synthesis of Organic and Carbon Aerogels from Phenol Furfural by Two-step Polymerization", Microporous and Mesoporous materials 96 (2006), pp. 115-120, www.sciencedirect.com, www.elsevier.com/locate/micromeso, Zhongshan University, Guangzhou, PR China, doi:10.1016/j.micromeso.2006.06.022.

Dingcai Wu et al., "The Preparation of Carbon Aerogels Based Upon the Gelation of Resorcinol Furfural in Isopropanol with Organic Base Catalyst", Journal of Non-Crystalline Solids 336 (2004), pp. 26-31, www.sciencedirect.com, www.elsevier.com/locate/jnoncrysol, Zhongshan University, Guangzhou, Peoples Republic of China, doi:10.1016/j.noncrysol.2003.12.051.

Takuji Yamamoto et al., "Interpretation of Structure Formation During the Sol-gel Transition of a Resorcinol-formaldehyde Solution by Population Balance", Journal of Colloid and Interface Science 264 (2003), pp. 532-537, www.sciencedirect.com, www.elsevier.com/locate/jcis, National Institute of Advanced Industrial Science and Technology, Tsukuba, Japan, doi:10.1016/S0021-9797(03)00481-8.

T. Yamamoto et al., "Evaluation of Porous Structure of Resorcinol-formaldehyde Hydrogels by Thermoporometry", Thermochimica Acta 439 (2005), pp. 74-79, www.sciencedirect.com, www.elsevier.com/locate/tca, National Institute of Advanced Industrial Science and Technology (AIST), Ibaraki, Japan, doi:10.1016/j.tca.2005.09.010.

T. Yamamoto et al., "The Effects of Different Synthetic Conditions on the Porous Properties of Carbon Cryogel Microspheres", Carbon 43 (2005), pp. 1231-1238, www.sciencedirect.com, www.elsevier.

(56) References Cited

PUBLICATIONS com/locate/carbon, National Institute of Advanced Industrial Science and Technology (AIST), Ibaraki, Japan, doi:10.1016/j.carbon.2004.12.016.

T. Yamamoto et al., "Control of Mesoporosity of Carbon Gels Prepared by Sol-gel Polycondensation and Freeze Drying", Journal of Non-Crystalline Solids 288 (2001), pp. 46-55, www.elsevier.com/locate/jnoncrysol, Kyoto University, Kyoto, Japan.

In Yang et al., "Adhesives Formulated With Chemically Modified Okara and Phenol-resorcinol-formaldehyde for bonding Fancy Veneer onto High-density Fiberboard", Journal of Industrial Engineering Chemistry 15 (2009), pp. 398-402, www.elsevier.com/locate/jiec, Seoul National University, Seoul, South Korea, doi:10.1016/j.jiec.2008.12.005.

Miki Yoshimune et al., "Preparation of Highly Mesoporous Carbon Membranes Via a Sol-gel process Using Resorcinol and Formaldehyde", Carbon 46 (2008), pp. 1031-1036, www.sciencedirect.com, www.elsevier.com/locate/carbon, National Institute of Advanced Industrial Science and Technology (AIST), Tsukuba, Japan, doi:10.1016/j.carbon.2008.03.007.

Rui Zhang et al., "Small Angle X-ray Scattering Study of Microstructure Changes of Organic Hydrogels from Supercritical Carbon Dioxide Drying", J. of Supercritical Fluids 28 (2004), pp. 263-276, www.sciencedirect.com, www.elsevier.com/locate/supflu, Chinese Academy of Sciences, Shanxi, China, doi:10.1016/S0896-8446(03)00041-X.

Lin Zhang et al., "Structure and Electrochemical Properties of Resorcinol Formaldehyde Polymer-based Carbon for Electric Double-layer Capacitors", Carbon 45 (2007), pp. 1439-1445, www.sciencedirect.com, www.elsevier.com/locate/carbon, Hunan University, Changsha, PR China, doi:10.1016/j.carbon.2007.03.030.

Shuting Zhang et al., "Preparation and Characterization of Antibacterial Silver-dispersed Activated Carbon Aerogels", Carbon 42 (2004), pp. 3209-3216, www.sciencedirect.com, www.elsevier.com/locate/carbon, Zhongshan University, Guangzhou, PR China, doi:10.1016/j.carbon.2004.08.004.

Hai-xia Zhao et al., "Pore Structure Modification and electrochemical Performance of Carbon Aerogels from Resorcinol and Formaldehyde", Carbon 47 (2009), pp. 1613-1616, Dalian University of Technology, Dalian, China, doi:10.1016/j.carbon.2008.12.017.

Yudong Zhu et al., Resorcinol-formaldehyde Based Porous Carbon as an Electrode Material for Supercapacitors, Carbon 45 (2007), pp. 160-165, www.sciencedirect.com, www.elsevier.com/locate/carbon, Dalian University of Technology, Dalian, People's Republic of China, doi:10.1016/j.carbon.2006.07.010.

Leire Zubizarreta et al., "Tailoring the Textural Properties of Activated Carbon Xerogels by Chemical Activation with KOH", Microporous and Mesoporous Materials 115 (2008), pp. 480-490, www.sciencedirect.com, www.elsevier.com/locate/micromeso, Université de Liège, Liège, Belgium, doi:10.1016/j.micromeso.2008.02.023.

(1) Addition step (2) Condensation step

THERMALLY CROSSLINKED GELS

FIELD

Some embodiments may generally relate to gels and their subsequent carbons. More specifically, certain embodiments may relate to a method of synthesizing gels and their subsequent activated carbons using a thermal-induced reaction approach to produce gels using only the main reactants; without the use of catalysts, additives or solvents.

BACKGROUND

Organic gels (i.e., xerogels, aerogels and cryogels) and their subsequent activated carbons were previously introduced. These gels and their activated carbons are privileged with hierarchical porous structures, which make them suitable for various applications. The way of drying these gels has a strong effect on the resulting pore structures and pore sizes after carbonization and activation processes. Drying the gel may be accomplished by three different methods; including, for example, supercritical, freezing, and evaporative drying methods. The gels obtained by these drying methods are named after their precursors as aerogels, cryogels or xerogels, respectively. Further, hydrogels and their subsequent activated carbons could be adjoined with these previous gels as well.

Gels in FIG. 1 could be obtained with variety of phenolic monomers such as phenol, resorcinol, catechol, hydroquinone and phloroglucinol and/or their mixtures thereof. Further, resorcinol-formaldehyde, melamine-formaldehyde, phenolic-furfural, phenol-urea, urea-formaldehyde, phenyldiamine-formaldehyde and their related reactants (as examples) are common precursors for gels and their subsequent activated carbons. It is well known in literature that the resorcinol-formaldehyde (RF) gels are prepared by utilizing water as an aqueous medium with adjusted pH levels and sodium carbonate anhydrous as a catalyst to initiate the reaction and accelerate its rate. However, due to the tedious and prolonged steps of gels preparation in the traditional methods reported in literatures, the markets of these gels and their subsequent carbons or activated carbons are very limited. Thus, there is a challenge to find a facile approach to downsize the fabrication costs by reducing the amounts of species that are involved in the reaction, minimize the preparation steps, fast rate of production with ease of scale up, cleanness of gels to be used in a wide range of applications such pharmaceuticals, cosmetics and biomaterials, and making the process of synthesis in a environmental-friendly route at ambient temperature and atmospheric pressure.

The traditional method of producing xerogels, aerogels, or cryogels and their subsequent activated carbons includes several steps. These steps involve: (i) a synthesis process, in which the gelation and curing processes occur to produce wet gels; (ii) a drying process, in which the excess solvent is removed from the wet gel to obtain a dry gel; (iii) a carbonization process to produce carbon gels; and (iv) an activation process to produce their subsequent activated carbons. The polymerization and gelation reactions between resorcinol and formaldehyde require adjusting the pH level of its reaction media and the addition of a catalyst to initiate both reactions. Further, in order to increase the reaction rate, it is essential to heat up the precursor media. A widely used process involves heating in an oven to a relatively high temperature; not exceeding 100° C. (in order to prohibit the precursor aqueous medium from boiling and evaporation). Furthermore, several solvent exchange steps are required in traditional methods to support and accelerate the curing of gels formed. Additionally, the traditional synthesis process needs several days for the synthesis step to be completed. These factors are considered among the main obstacles and challenges for the implementation of this process on the mass production scale. Consequently, there is a dire desire to carry out research to develop easier, faster, environmentally-friendlier and cheaper methods of gel preparation with high purity of final products (without impurities of remaining catalysts or additives) in purpose of making them more attractive and competitive than other commercial materials. Consequently, the clean gels create new glimpse of hope for new sensitive and vital applications such as biomaterials, pharmaceutics, cosmetics, etc.

Further, the traditional synthesis methods require additives (including catalysts, solvents, and acid/base ingredients) to initiate the reaction process. Moreover, the conventional methods take a long time to produce the designed gels, and the emerging gels require tedious and costly drying procedures. In addition, the additives used in the conventional methods can remain trapped into the formed gel matrix, which can make them also not environmentally friendly. Furthermore, the trapped additives can restrict the use of the corresponding gels in sensitive and vital applications (e.g., biomaterials, cosmetics, and pharmaceutics) that require the use of highly pure and clean materials.

In view of the challenges with the traditional methods, there is a dire need to develop improved novel synthesis route to produce gels in a fast rate of production without involving extra chemical species or additives into the reaction media. There is also a need to reduce the cost for industry and make the outcome product friendlier to the environment, and facilitate the manufacturing process on a mass production scale to save time and efforts, reduce cost, and increase the production rate of highly pure gels without impurities from in-situ precursors that contaminate the final gels and restrict their applications. Besides, creation of new generation of sensitive and vital applications.

SUMMARY

Certain embodiments may be directed to a method of synthesizing a gel. The method may include dissolving resorcinol and formaldehyde to form a solution. The method may also include subjecting the solution to nitrogen gas flow. The method may further include subjecting the solution to a vacuum procedure at a melting point temperature of resorcinol forming the gel. In addition, the method may include re-subjecting the gel to the vacuum procedure at a temperature lower than the melting point of resorcinol. Further, the method may include cooling the gel after the vacuum procedure. The method may also include extracting the synthesized gel.

Other embodiments may be directed to a method of carbonizing and activating a gel. The method may include subjecting the gel to nitrogen gas flow. The method may also include subjecting the gel to a heat temperature with a rate of 10° C./minute. The method may further include maintaining the gel at the heat temperature. In addition, the method may include cooling the gel to room temperature while purging the nitrogen gas.

BRIEF DESCRIPTION OF THE DRAWINGS

The accompanying drawings, which are included to provide a further understanding of the invention and are incorporated in and constitute a part of this specification, illustrate some embodiments as examples; and the main concept of this invention and together with the detail description serve to explain the principles and conceptualizations of the invention. In the drawings.

DETAILED DESCRIPTION

It will be readily understood that the components of certain example embodiments, as generally described and illustrated in the figures herein, may be arranged and designed in a wide variety of different configurations. The following is a detailed description of some embodiments for synthesizing gels and their subsequent activated carbons using a thermal route to produce gels without the use of catalysts, additives, initiators, or solvents.

The features, characteristics, and/or structures of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, characteristic, and/or structure described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, and/or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles, conceptualizations, designations and teachings of certain example embodiments, and not in limitation thereof or thereon.

Figure 1:
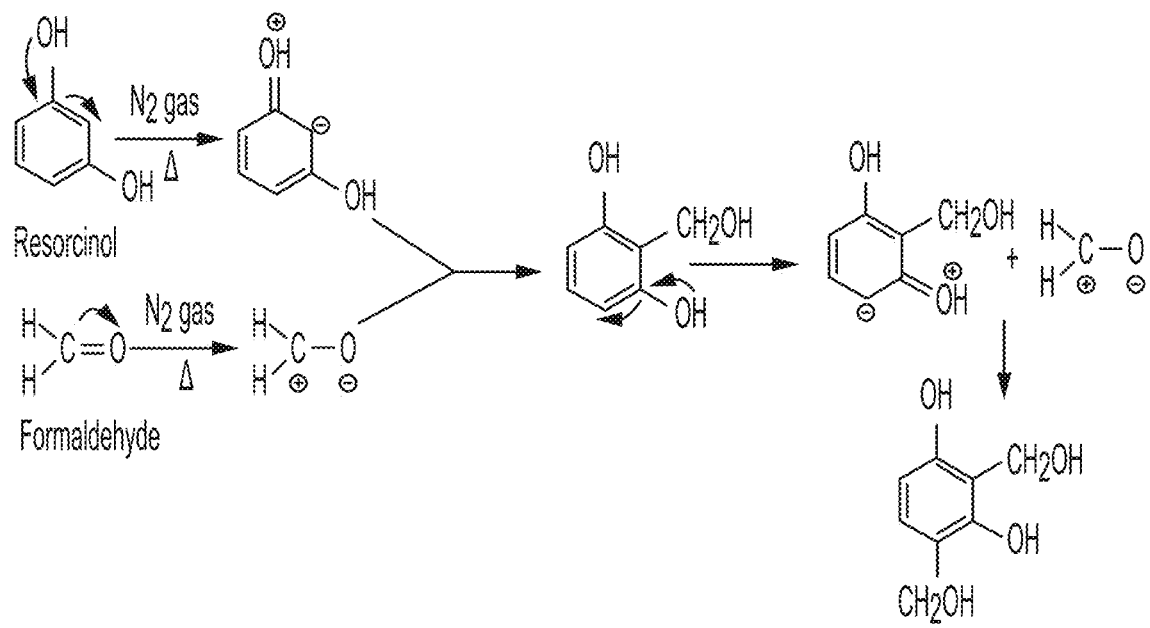
FIG. 1 illustrates the suggested reaction mechanism of a thermal route to crosslink resorcinol (R) and formaldehyde (F) reactants to form a resorcinol-formaldehyde gel (RFG), according to certain embodiments.
Figure 1:
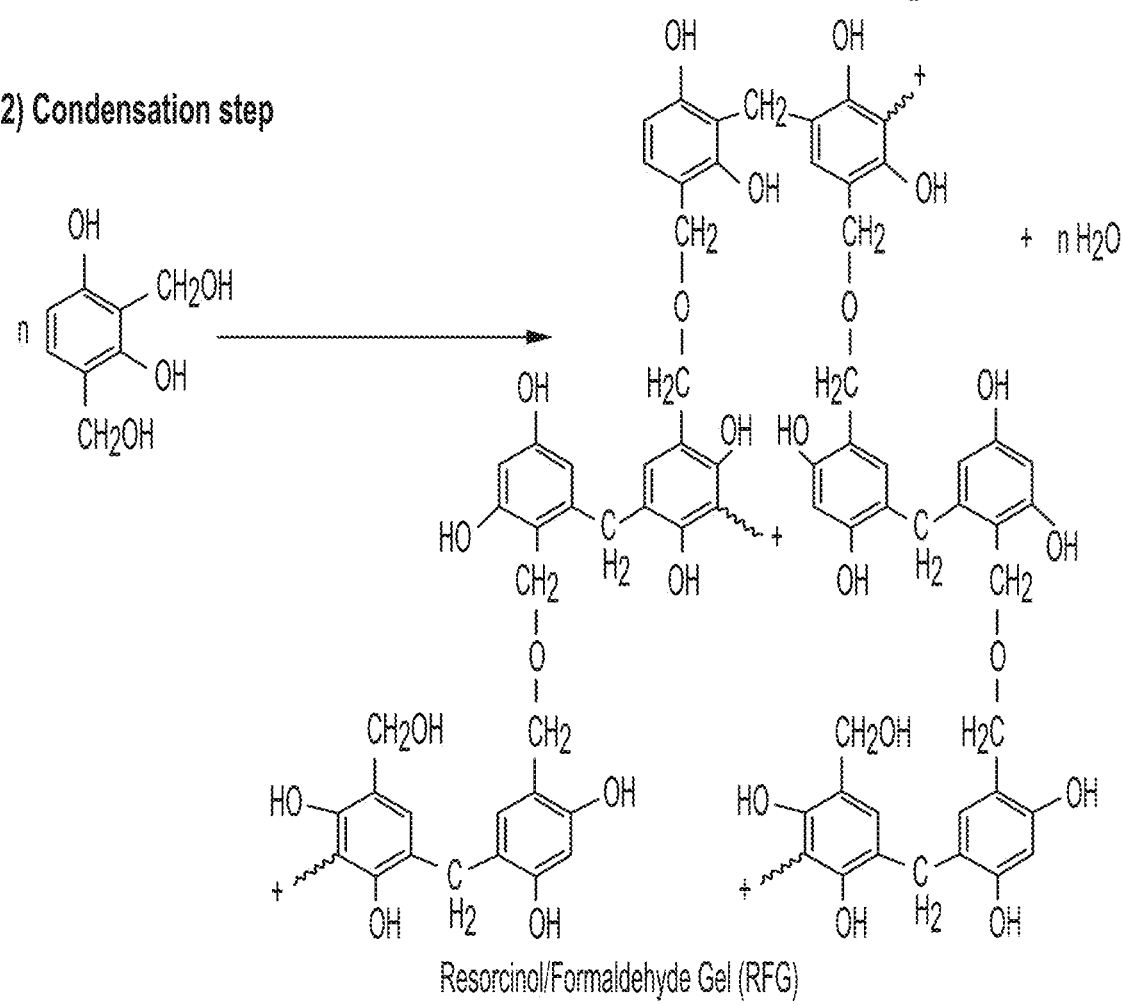

FIG. 1 illustrates the suggested reaction mechanism of a thermal route to crosslink resorcinol (R) and formaldehyde (F) reactants to form a resorcinol-formaldehyde gel (RFG), according to certain embodiments. According to certain embodiments, crosslinked gels could be synthesized from R and F based on a thermal route without using catalysts or solvents or additives or chemical initiators or controlling the acidity of the starting solution into the reaction media. The resulting RFG samples and their subsequent activated carbon (RFG-AC) samples are coded with numbers referring to the applied recipes of R and F reactant amounts, and molar ratios of the resorcinol-to-formaldehyde (R:F) as listed in Table 1. In certain embodiments, both the RFG and the RFG-AC samples may be preferable, since RFG-AC is a derivative of RFG. Further, R (12.44 g) is added to the prescribed volume of formaldehyde (see Table 1), and dissolved completely via magnetic stirring at 1 atm and room temperature. The dissolved mixture of R and F solutions may then be poured into the container of a pressure reactor.

TABLE 1

Chemical recipes of synthesis for RFGn and subsequent RFGn-AC samples.

| n | R:F* | R (g) | F (mL) |
|---|------|-------|--------|
| 1 | 0.90 | 12.44 | 10.19 |
| 2 | 0.80 | 12.44 | 11.46 |
| 3 | 0.70 | 12.44 | 13.10 |
| 4 | 0.60 | 12.44 | 15.28 |
| 5 | 0.50 | 12.44 | 17.40 |
| 6 | 0.40 | 12.44 | 21.74 |
| 7 | 0.30 | 12.44 | 28.99 |
| 8 | 0.20 | 12.44 | 45.84 |
| 9 | 0.10 | 12.44 | 91.68 |

*Molar ratio of resorcinol to formaldehyde (R:F)

In certain embodiments, the mixture may be stirred inside the pressure reactor while purging with nitrogen gas (flow rate of 150 cm$^3$/min at 0.3 bar) for about 15 minutes. In other embodiments, other inert gases may also be used instead of nitrogen. Then, the reactor may be evacuated at room temperature and sustained for about 5 minutes under a vacuum of 0.06 bar. In certain embodiments, the temperature of the pressure reactor (which contains the mixture) may be elevated to be about 110±2° C. and maintained at that temperature for about 30 minutes. The reactor may then be allowed to cool down spontaneously to room temperature, and then heated up again to attain about 100° C. under evacuation of 0.06 bar for about 24 hours in order to dry the formed gel inside the reactor container before the extraction process. The vacuum may then be released to retrieve the formed dry gel products, and the formed gel products may be named as resorcinol-formaldehyde gel (RFGn), where the numeric suffix (n) indicates the sample number (see Table 1). According to certain embodiments, this method could be used to prepare physical and/or chemical gels in general using different gases at different pressures as well.

According to certain embodiments, carbonization and activation processes may be performed on the dried RFG sample synthesized from the thermal route described herein. For instance, the dried RFG sample may be placed in a ceramic boat inside a programmable electric-heated tube furnace while passing nitrogen gas with a continuous flow of 100 cm$^3$/min at 0.3 bar. The dried RFG sample inside the tube furnace may first be kept at room temperature for about 40 minutes to guarantee that air is fully purged and replaced with the flowing N$_2$ gas. Then, the furnace may be heated up to a temperature of about 500° C. with a heating rate 10° C./minute and kept at the same temperature for about 3 hours while flowing nitrogen, and then let to cool down spontaneously to room temperature while still flowing the nitrogen gas through the tube furnace. The emerging carbons may be activated in the same tube furnace (after cleaning comprehensively from carbonization process remains) while passing carbon dioxide gas (with a flow rate of about 150 cm$^3$/min at 0.3 bar) instead of nitrogen gas, heating the sample again up to about 700° C. with a heating rate of 10° C./minute, and keeping the sample at this temperature for about 1 hour. The sample may then be allowed to cool down spontaneously to room temperature while still flowing carbon dioxide gas through. After the carbonization and activation processes of the RFGn samples, the outcome products may be named RFGn activated carbon and denoted hereafter as RFGn-AC, where the number (n) refers to the code number of the corresponding RFGn precursor (see Table 1). Overall and generally the activation process may be conducted by chemical or physical methods, and using different gases at different temperatures.

In certain embodiments, the Fourier transform (FT) Raman spectra may be measured by utilizing a Bruker FT-Raman spectrometer of type RFS 100S that is attached to a Bruker-IFS 66/S spectrometer. Fourier transform infra red (FTIR) spectroscopy may be utilized to examine the structure of the synthesized samples, and X-ray diffraction (XRD) measurements may be proceeded by a Miniflex II Benchtop XRD apparatus. The 2θ scan data may be conducted in the range of 5° to 80°. In addition, the morphologies of RFGn and RFGn-AC samples may be scanned by SEM FEI Nova™ nanoscanning electron microscopy 450 (Nova NanoSEM). The chemical compositions of RFGn and RFGn-AC samples may be studied by Energy-dispersive X-ray spectroscopy (EDX) connected to Nova NanoSEM.

In certain embodiments, thermogravimetric analysis (TGA) may be carried out by a PerkinElmer Pyris6 TGA analyzer under nitrogen gas in the temperature range of ~30 to ~850° C. with a heating rate of 10° C./min. A differential scanning calorimetry (DSC) analyzer may be utilized under a flow of nitrogen gas in the temperature range of 30 to 400° C. with a heating rate of 10° C./min. In addition, a Micromeritics ASAP2420® Accelerated Surface Area and Porosimetry Analyzer System, with an enhanced micropore capability (utilizing 1-Torr pressure transducer) may be used to study the pore structures of the RFGn and RFGn-AC samples through the adsorption/desorption isotherms of nitrogen gas at 77 K. Prior to the adsorption/desorption measurements, RFGn and RFGn-AC samples may be degassed in-situ for 24 hours at 423 and 473 K, respectively under vacuum (1×10$^{-4}$ Pa). The pore structures of RFGn and RFGn-AC samples may be determined by built-in calculations depending on the density functional theory (DFT).

Figure 2A:
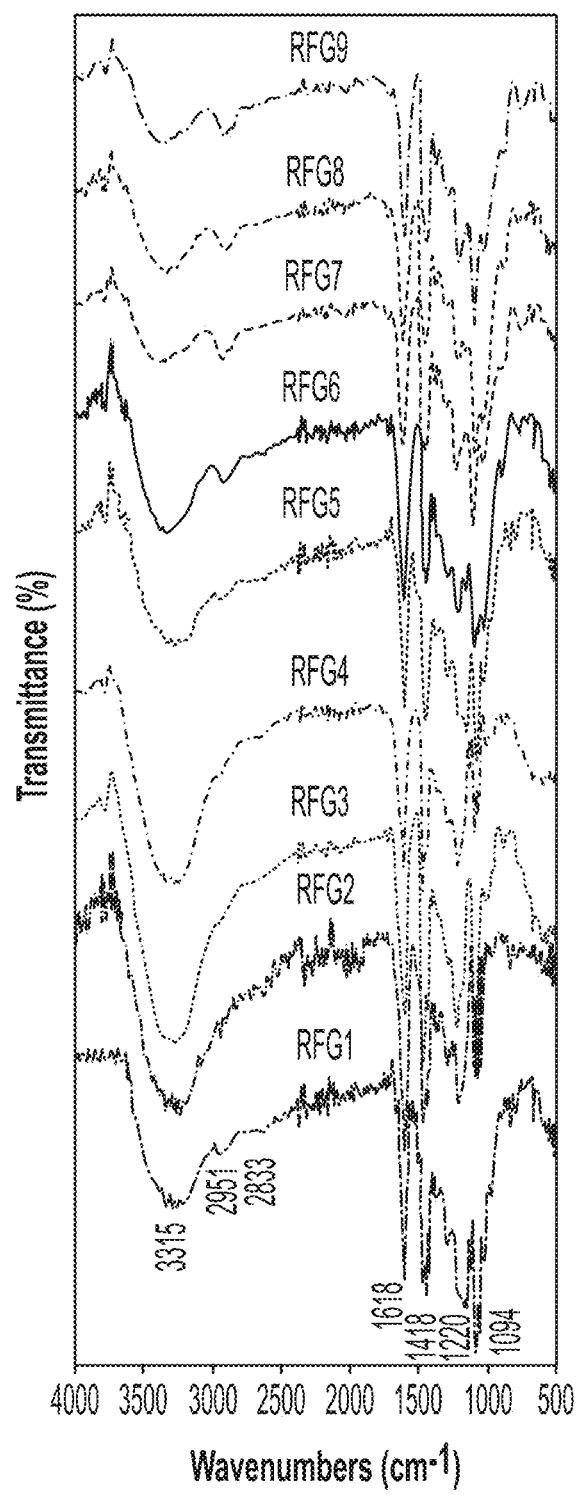
FIG. 2(a) illustrates Fourier transform infrared (FTIR) spectra of RFGn samples synthesized at different molar ratios, according to certain embodiments.
Figure 2B:
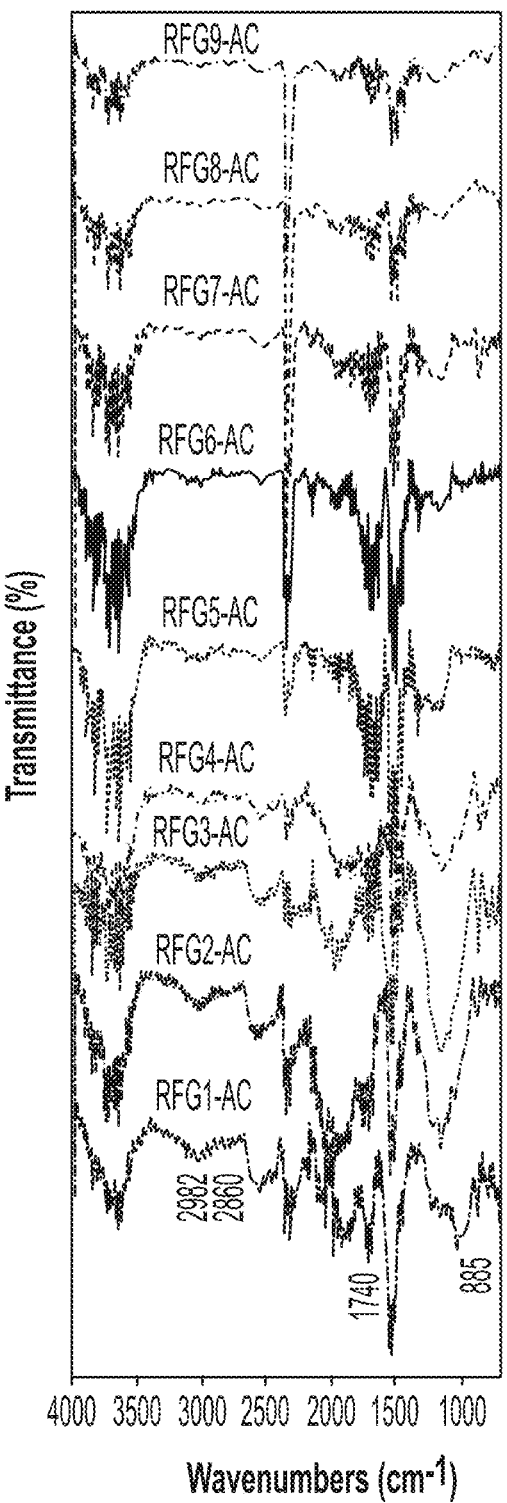
FIG. 2(b) illustrates FTIR spectra of RFGn's subsequent activated carbons (RFGn-AC), according to certain embodiments.

FIG. 2(a) illustrates the FTIR spectra of RFGn samples synthesized at different molar ratios, according to certain embodiments. Further, FIG. 2(b) illustrates the FTIR spectra of the subsequent activated carbons (RFGn-AC), according to certain embodiments. As illustrated in FIG. 2(a), the FTIR spectra of all RFGn samples expose a broad band at 3315 cm', which is assignable to the —OH stretching vibration group of the resorcinol reactant. The two bands of 2833 and 2951 cm' belong to the CH$_2$— and CH$_3$— stretching vibrations, respectively, and the band at 1478 cm$^{-1}$ refers to CH$_2$— scissor vibration and CH$_3$-flexural vibration. The band at 1618 cm$^{-1}$ may be assigned to the stretching vibration of aromatic rings of resorcinol. Further, the peaks of methylene-ether bridge bond (CH$_2$—O—CH$_2$) formed between the aromatic ring of resorcinol and formaldehyde molecules via polycondensation reaction are observed at 1094 and 1220 cm$^{-1}$. In addition, the variation of R:F ratios results in the same function groups appearing around the same positions for all RFGn samples.

FIG. 2(b) illustrates the FTIR spectra of RFGn-AC in which the band exhibited at 3414 cm$^{-1}$ corresponds to the elongated vibrations of O—H groups. Further, the carbonyl band appears at 1740 cm$^{-1}$. In addition, the bands at 2982 and 2860 cm$^{-1}$ correspond to elongated vibrations of C—H bond in CH$_2$ group of chains, and the deformation vibrations band of C—H of aromatic rings appears at 885 cm$^{-1}$. As illustrated in FIG. 2(b), the effect of R:F ratios of the various RFGn precursors of subsequent RFGn-AC samples on the FTIR spectra are almost the same, where the bands around appear at the same positions.

In certain embodiments, the elemental analyses of RFGn and RFGn-AC samples obtained by using EDX are listed in Table 2. The percentages of carbon in RFGn samples ranged from 83.72% to 87.97%, and the percentages of oxygen in RFGn samples ranged from 12.03% to 16.28%. Moreover, the percentages of carbon in RFGn-AC samples ranged from 97.93% to 99.2%, and the percentages of oxygen ranged from 0.75% to 2.07%. Overall, the results refer to that the percentage values of carbon or oxygen in either RFGn or RFGn-AC samples are not affected noticeably with the R:F ratios used in their recipes.

The values of RFGn and RFGn-AC samples of both samples are listed in Table 2. Through the results either in FIG. 3(c) or Table 2, the $I_D/I_G$ ratio values of RFGn samples range from 0.550 to 0.629, and the $I_D/I_G$ ratio values of RFGn-AC samples range from 0.806 to 0.889.

Figure 4A:
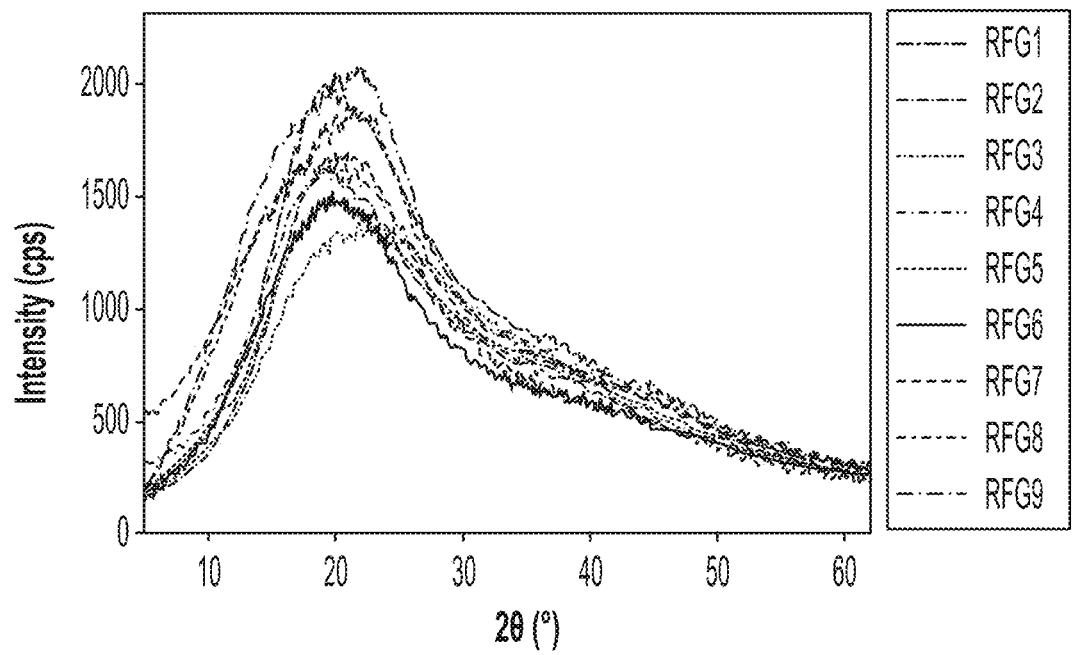
FIG. 4(a) illustrates X-ray diffraction (XRD) patterns of RFGn samples, according to certain embodiments.
Figure 4B:
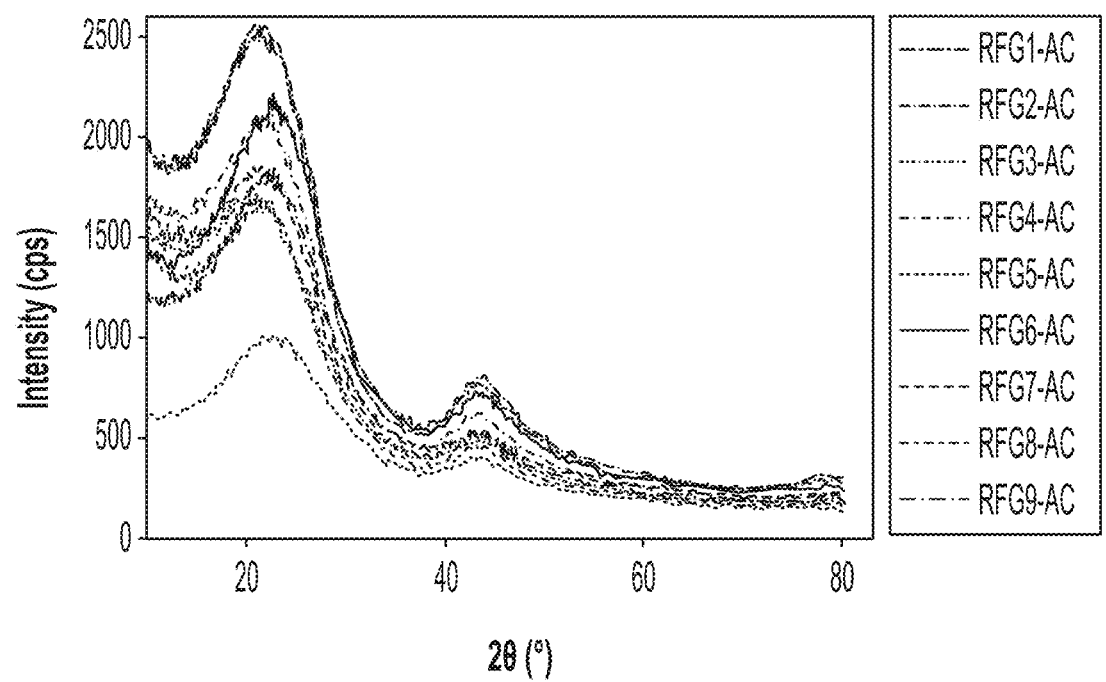
FIG. 4(b) illustrates XRD patterns of RFGn-AC samples, according to certain embodiments.

FIG. 4(a) illustrates XRD patterns of RFGn samples, according to certain embodiments. Further, FIG. 4(b) illustrates XRD patterns of RFGn-AC samples, according to certain embodiments. As illustrated in FIG. 4(a), the peaks of RFG1, RFG2, RFG3, RFG4, RFG5, RFG6, RFG7, RFG8, and RFG9 appear at 2θ values of 18.70°, 18.72°, 21.80°,

TABLE 2

| Properties of (a) RFGn and (b) RFGn-AC samples. | | | | | | | | | |
|---|---|---|---|---|---|---|---|---|---|
| | n = 1 | n = 2 | n = 3 | n = 4 | n = 5 | n = 6 | n = 7 | n = 8 | n = 9 |
| (a) RFGn Samples | | | | | | | | | |
| Average pore size (nm)[a] | 62.8 | 25.9 | 3.5 | 3.5 | 3.8 | 8.1 | 10.31 | 62.9 | 3.9 |
| Micropore (%)[a] | 1.2 | 0.0 | 1.0 | 0.4 | 0.6 | 0.6 | 0.6 | 0.5 | 0.3 |
| Mesopore (%)[a] | 48.5 | 9.0 | 32.9 | 11.2 | 17.8 | 17.8 | 17.8 | 19.2 | 11.2 |
| Macropore (%) | 50.3 | 91.0 | 66.1 | 88.4 | 81.6 | 81.6 | 81.6 | 80.3 | 88.5 |
| S (m$^2$/g)[a] | 0.011 | 0.32 | 145.40 | 176.15 | 67.49 | 147.66 | 118.26 | 0.909 | 0.614 |
| $V_{Total}$ (cm$^3$/g) | 0.0004 | 0.0043 | 0.2525 | 0.292 | 0.127 | 0.546 | 0.522 | 0.028 | 0.0014 |
| Average particle size (μm)[a] | 532.010 | 90.078 | 0.245 | 0.167 | 0.416 | 0.109 | 0.146 | 11.121 | 13.175 |
| N$_2$ (mmol/g)[a] | 0.05 | 0.16 | 8.21 | 8.98 | 4.28 | 17.70 | 16.85 | 0.84 | 0.01 |
| $I_D/I_G$[d] | 0.629 | 0.558 | 0.576 | 0.600 | 0.610 | 0.614 | 0.612 | 0.556 | 0.550 |
| Carbon (wt. %)[c] | 87.01 | 86.04 | 85.71 | 86.87 | 83.72 | 86.93 | 86.55 | 87.97 | 87.97 |
| Oxygen (wt. %)[c] | 12.99 | 13.96 | 14.29 | 13.13 | 16.28 | 13.07 | 13.45 | 12.03 | 12.03 |
| (b) RFGn-AC Samples | | | | | | | | | |
| Average pore size (nm)[a] | 1.1 | 1.1 | 1.4 | 1.1 | 1.3 | 1.8 | 2.0 | 0.9 | 0.9 |
| Micropore (%)[a] | 0.3 | 0.3 | 0.3 | 0.6 | 0.3 | 0.4 | 0.4 | 0.3 | 0.6 |
| Mesopore (%)[a] | 11.2 | 11.2 | 11.2 | 17.8 | 11.2 | 11.2 | 15.3 | 12.1 | 19.3 |
| Macropore (%) | 88.4 | 88.4 | 88.4 | 81.7 | 88.4 | 88.4 | 85.4 | 88.4 | 81.7 |
| S (m$^2$/g)[a] | 165.92 | 160.92 | 511.46 | 368.89 | 333.32 | 370.81 | 356.26 | 308.49 | 368.51 |
| $V_{Total}$ (cm$^3$/g) | 0.0947 | 0.086 | 0.366 | 0.220 | 0.215 | 0.342 | 0.348 | 0.1507 | 0.162 |
| Average particle size (μm)[a] | 253.8 | 315.5 | 0.295 | 0.207 | 0.433 | 0.818 | 0.194 | 1.356 | 0.336 |
| N$_2$ (mmol/g)[a] | 3.24 | 2.64 | 11.97 | 7.59 | 7.35 | 11.16 | 11.96 | 5.35 | 5.69 |
| $I_D/I_G$[d] | 0.795 | 0.877 | 0.883 | 0.851 | 0.839 | 0.889 | 0.832 | 0.813 | 0.806 |
| Carbon (wt. %)[c] | 99.05 | 98.21 | 99.2 | 98.85 | 99.13 | 97.93 | 99.2 | 98.98 | 98.07 |
| Oxygen (wt. %)[c] | 0.95 | 1.79 | 0.79 | 1.15 | 0.87 | 2.07 | 0.75 | 1.02 | 1.93 |

[a]determined from surface area and porosity analyzer Micromeritics ASAP 2420 and calculations of micro-, meso and macropores values based on incremental surface area,
[b]determined from Raman spectra and
[c]determined from EDX.

Figure 3A:
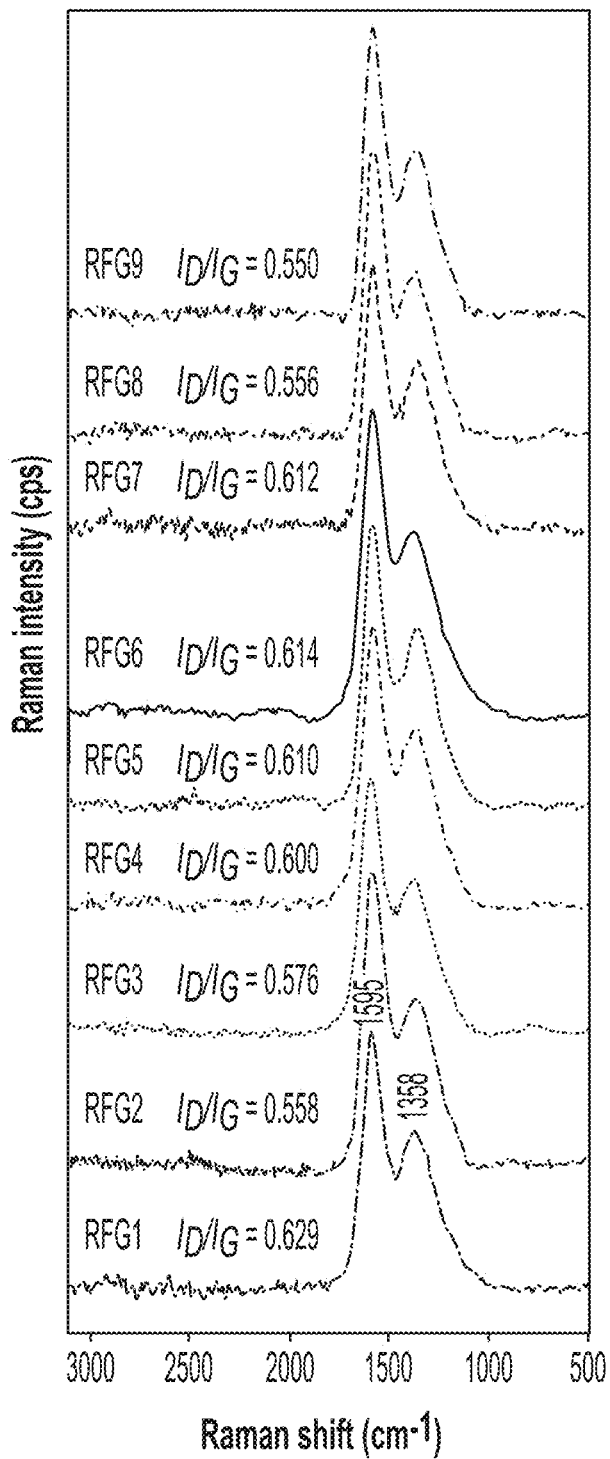
FIG. 3(a) illustrates Raman spectra of RFGn samples, according to certain embodiments.
Figure 3B:
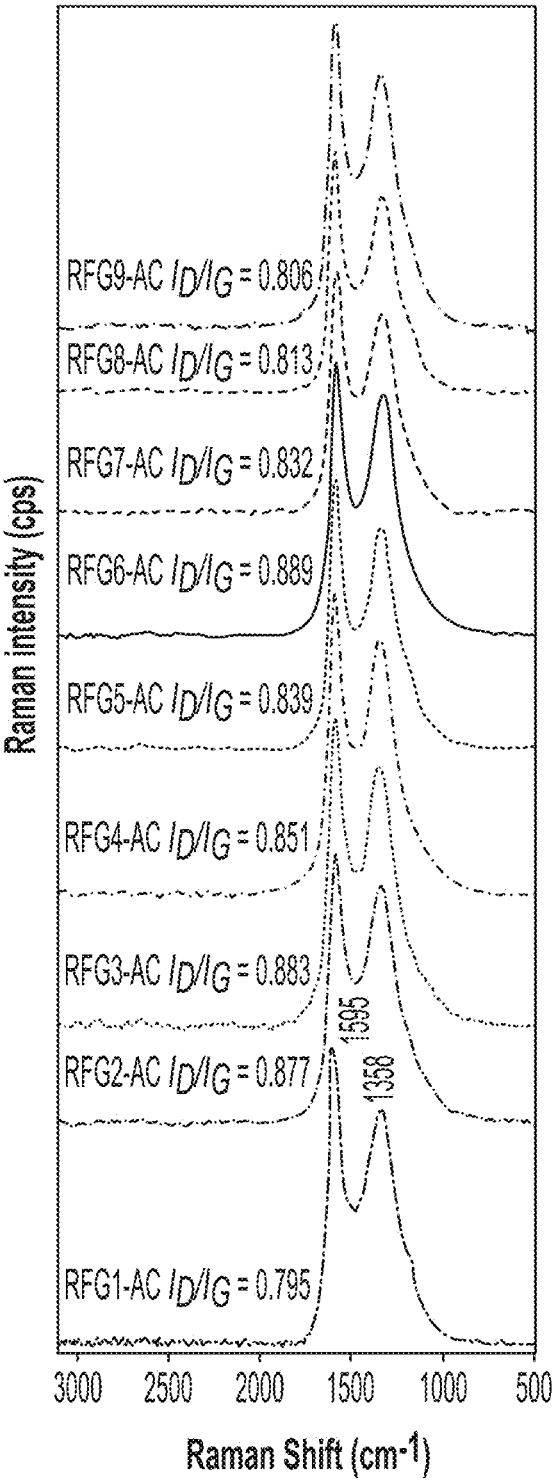
FIG. 3(b) illustrates Raman spectra of RFGn-AC samples, according to certain embodiments.
Figure 3C:
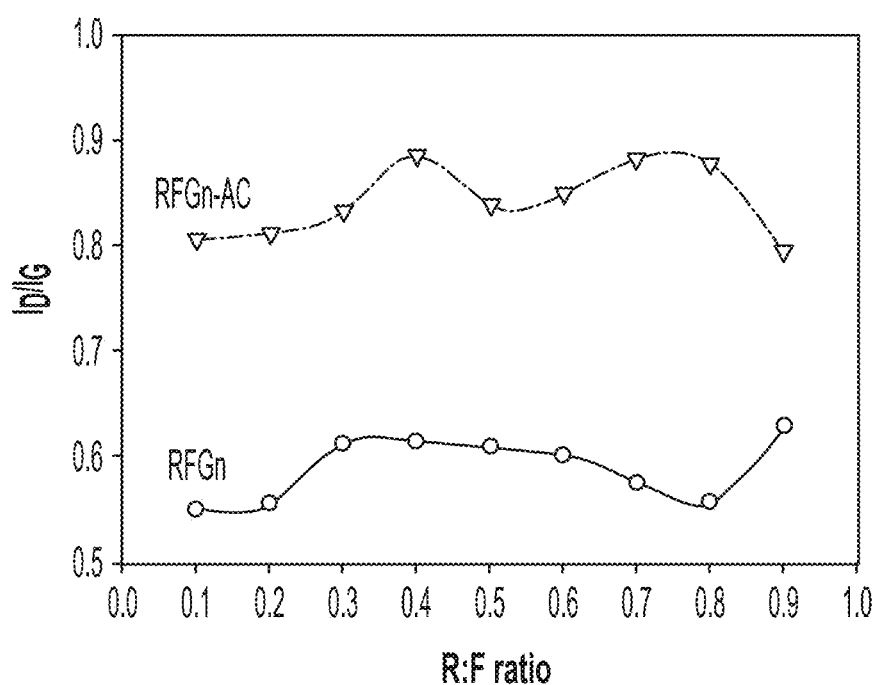
FIG. 3(c) illustrates relationships between $I_D/I_G$ ratios derived from Raman spectra of RFGn and RFGn-AC samples, according to the former and the later embodiments.

FIG. 3(a) illustrates the Raman spectra of RFGn samples, according to certain embodiments, and FIG. 3(b) illustrates the Raman spectra of RFGn-AC samples, according to other embodiments. Further, FIG. 3(c) illustrates the relationship between $I_D/I_G$ ratio (derived from Raman spectra of RFGn and RFGn-AC samples) and the R:F molar ratios utilized in the gels synthesis, according to certain embodiments. As illustrated in FIGS. 3(a) and 3(b), the characteristic peaks appear at 1358 and 1595 cm$^{-1}$, which refer to disorder peak (refers to as D-band) and graphitic peak (refers to as G-band), respectively. The intensity ratio of the D-band to the G-band (i.e., $I_D/I_G$ ratio) helps to determine the order and disorders/defects into the structure of RFGn and RFGn-AC samples. The values of the $I_D/I_G$ ratio of RFGn and RFGn-AC samples are listed in Table 2 and on the corresponding curves in FIGS. 3(a) and 3(b), respectively. Overall, it is noticed that the $I_D/I_G$ ratio values of RFGn samples range from 0.550 to 0.629 and the $I_D/I_G$ ratio values of RFGn-AC samples range from 0.806 to 0.889. These $I_D/I_G$ ratio results indicate that the defects or disorder into the structures of RFGn is lower than the corresponding values of RFGn-AC.

19.67°, 19.65°, 19.65°, 20.49°, 21.47°, and 21.94° with the corresponding full width at half maximum (FWHM) intensities of 1964, 1599, 1360, 1611, 1482, 1482, 1678, 1881, and 2064 cps, respectively. Thus, RFG3 exhibits the lowest FWHM intensity (1360 cps) and RFG9 shows the highest FWHM intensity (2064 cps). The difference in either 2θ or the FWHM intensity is due to the variations in the used synthesis recipe of main reactants (i.e., molar ratios of resorcinol to formaldehyde). From FIG. 4(b), it can be observed that RFGn-AC spectra appear at two main peaks. The first peaks of RFG1-AC, RFG2-AC, RFG3-AC, RFG4-AC, RFG5-AC, RFG6-AC, RFG7-AC, RFG8-AC, and RFG9-AC are 21.28°, 21.28°, 21.28°, 22.06°, 22.83°, 22.52°, 21.60°, 21.28°, and 22.66° with the corresponding FWHM intensities of 2561, 2523, 1721, 2087, 1033, 2202, 1851, 1682, and 1843 cps, respectively. Moreover, the lowest FWHM intensity belongs to RG5-AC, and the highest FWHM intensity is for RFG1-AC. The second peak appeared at 2θ=~43° for all samples with the corresponding FWHM intensities of 804, 804, 482, 639, 423, 742, 543, 487, and 492 for RFG1-AC, RFG2-AC, RFG3-AC, RFG4-AC, RFG5-AC, RFG6-AC, RFG7-AC, RFG8-AC, and RFG9-AC-AC, respectively. The lowest and highest FWHM intensities at 2θ=~43° are, respectively, for RFG5-AC and RFG1-AC≈RFG2-AC.

Figure 5A:
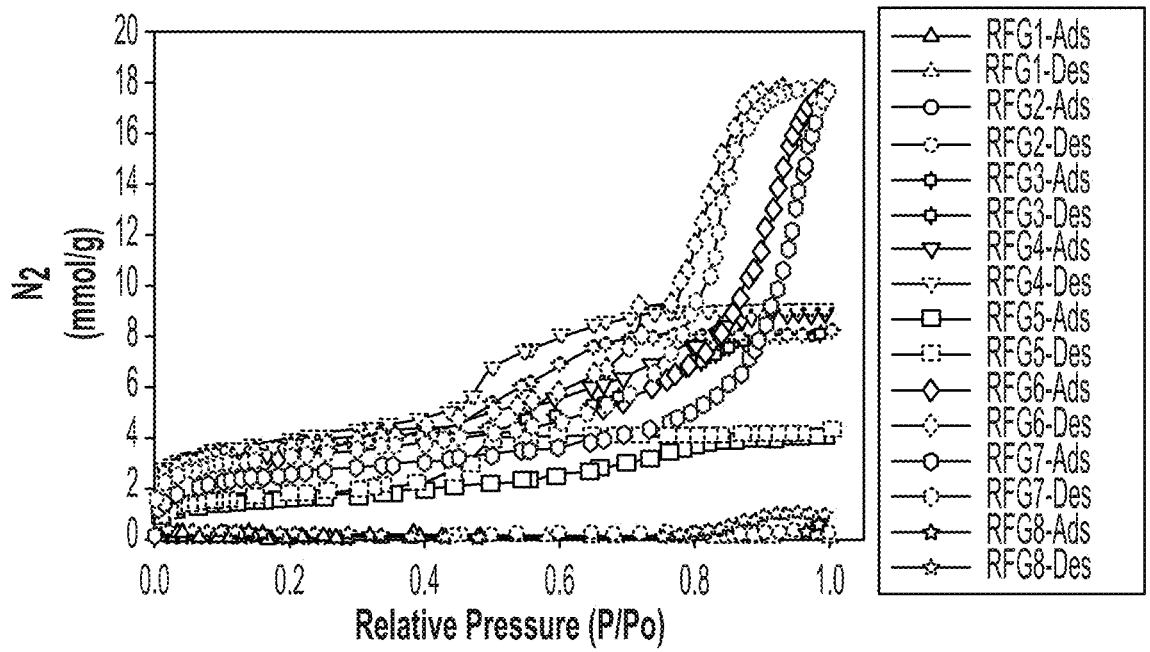
FIG. 5(a) illustrates $N_2$ gas adsorption/desorption isotherms at 77 K onto RFGn samples, according to certain embodiments.
Figure 5B:
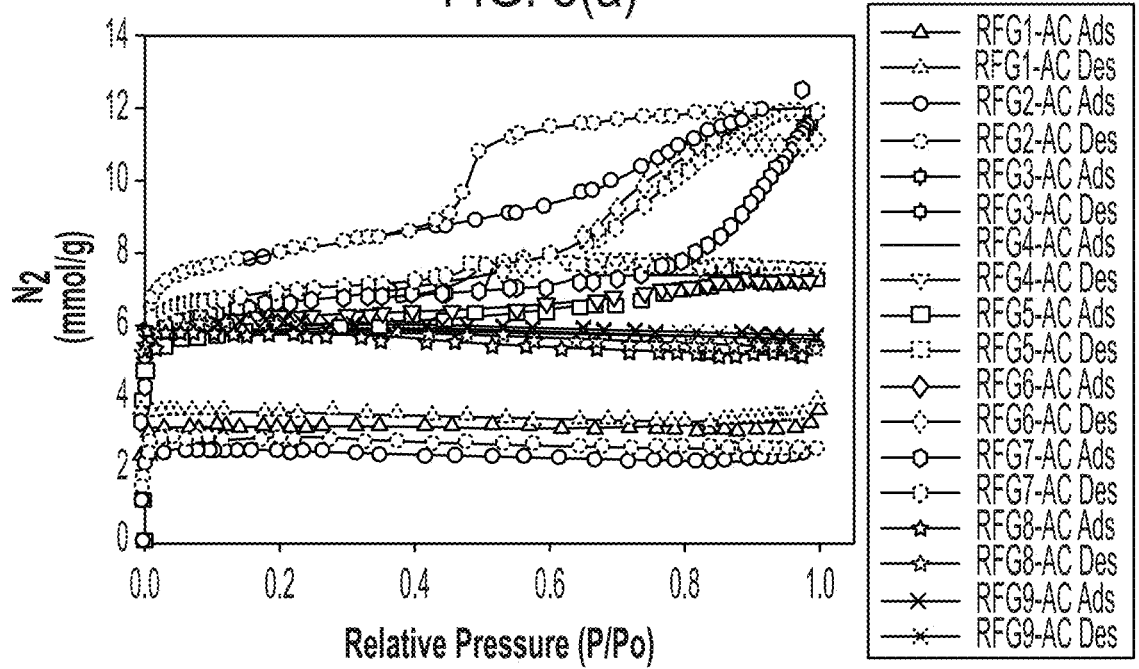
FIG. 5(b) illustrates $N_2$ gas adsorption/desorption isotherms at 77 K onto RFGn-AC samples, according to certain embodiments.

FIG. 5(a) illustrates the $N_2$ adsorption/desorption isotherms at 77 K onto RFGn samples, according to certain embodiments. In addition, FIG. 5(b) illustrates the $N_2$ adsorption/desorption isotherms at 77 K onto RFGn-AC samples, according to certain embodiments. RFGn samples include RFG1, RFG2, RFG3, RFG4, RFG5, RFG6, RFG7, RFG8, and RFG9. Further, RFGn-AC samples include RFG1-AC, RFG2-AC, RFG3-AC, RFG4-AC, RFG5-AC, RFG6-AC, RFG7-AC, RFG8-AC, and RFG9-AC. As illustrated in FIGS. 5(a) and 5(b), the adsorption/desorption isotherms are mostly of Type-IV isotherm; which indicates adsorption on mesoporous solids that proceeds via multilayer adsorption followed by capillary condensation. A characteristic of the Type-IV isotherm is its hysteresis loop associated with the capillary condensation taking place in mesopores, and the limiting of the uptake over a range of high $P/P_0$. The initial part of Type-IV isotherm (before the hysteresis loop) may be assigned to monolayer-multilayer adsorption. The straight line over a range of low $P/P_0$, which refers to the beginning of the almost linear middle section of the isotherm, often indicates to the stage at which monolayer coverage is complete and multilayer adsorption is about to begin. Furthermore, the hysteresis loops of the adsorption of nitrogen gas on RFGn and RFGn-AC samples may be of the type-H2 (indicates to the steepness of isotherm), which features narrow pore mouths (may be bottle-neck shaped pores) or relatively uniform channel-like pores or pore network (connectivity) effects.

Figure 6A:
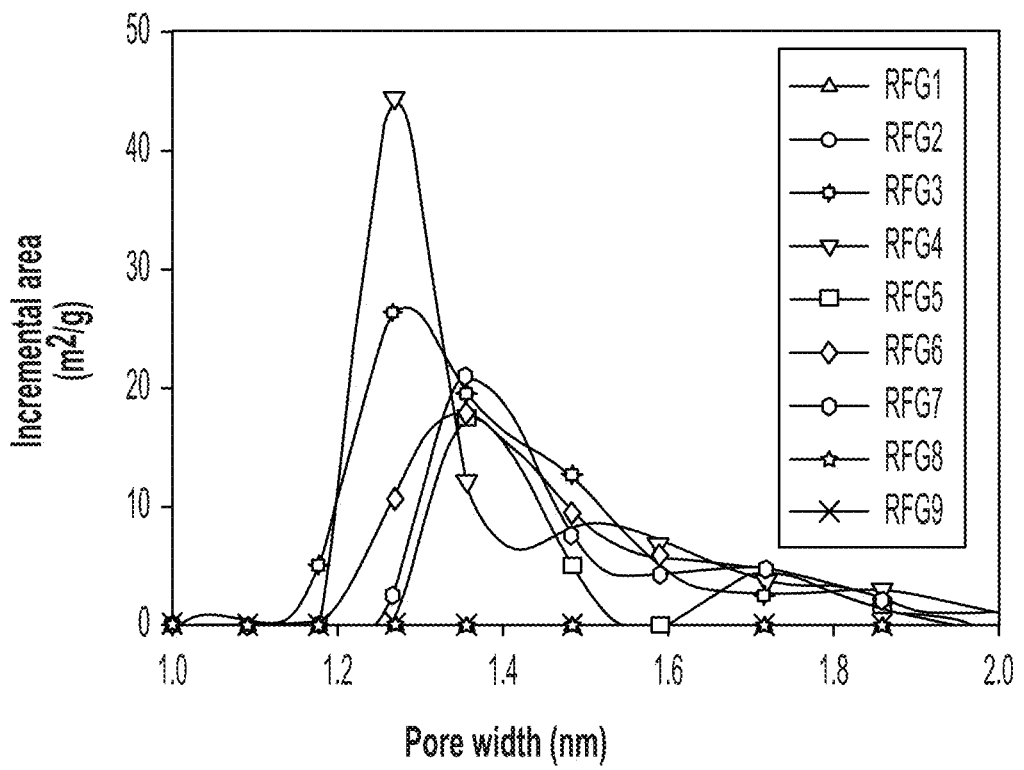
FIG. 6(a) illustrates incremental pore surface area versus pore width of RFGn samples, according to certain embodiments.
Figure 6B:
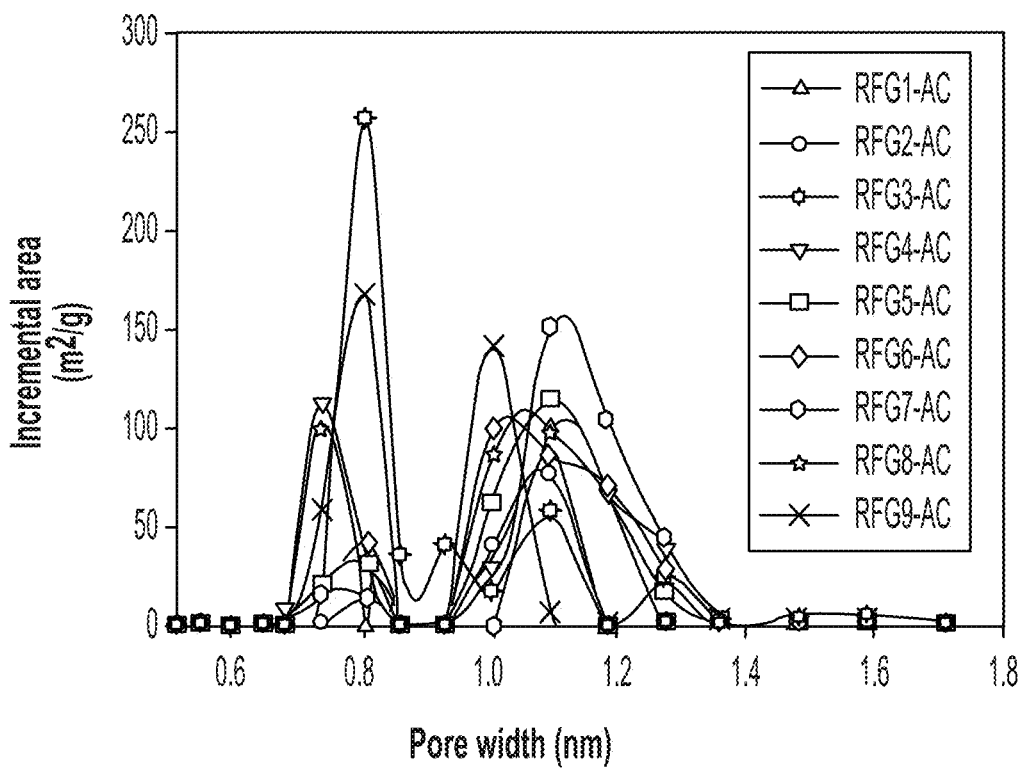
FIG. 6(b) illustrates incremental pore surface area versus pore width of RFGn-AC samples, according to certain embodiments.

FIG. 6(a) illustrates incremental pore area versus pore width of RFGn samples, according to certain embodiments. Further, FIG. 6(b) illustrates incremental pore area versus pore width of RFGn-AC samples, according to certain embodiments. The results of FIGS. 6(a) and 6(b) are in view point of low to high scale of pore sizes for all samples. It can be seen from FIG. 6(a) that RFG4 exposes two main peaks at 1.3 and 1.5 nm with the corresponding incremental pore areas of 44.42 and 8.77 $m^2/g$, respectively. RFG3 also exhibits two main peaks at 1.3 and 1.5 nm but with corresponding incremental pore areas of 27.01 and 12.70 $m^2/g$, respectively. Further, RG5, RFG6, and RFG7 show two main peaks at 1.4 and 1.7 nm. The corresponding incremental pore areas of RFG5, RFG6 and RFG7 at 1.4 nm are 18.16, 17.86 and 21.40 $m^2/g$, respectively. Moreover, the corresponding incremental pore areas of RG5, RFG6, and RFG7 at 1.7 are 3.77, 4.66, and 5.13 $m^2/g$, respectively. The samples of RFG1, RFG2, RFG8, and RFG9 show incremental pore areas less than 1 $m^2/g$. Overall, RFG4 represents the highest incremental pore area whereas RFG1, RFG2, RFG8, and RFG9 represent the lowest incremental pore areas <1 $m^2/g$. Furthermore, the highest incremental pore area for each RFGn was localized in microporous scale.

FIG. 6(b) illustrates that RFG3-AC exposes four main peaks at 0.8, 0.9. 1.1 and 1.3 nm for the corresponding incremental pore areas of 225.09, 39.61, 56.47 and 22.55 $m^2/g$, respectively. Further, RFG9-AC exhibits two main peaks at 0.8 and 1.0 nm for the corresponding incremental pore area of 167.25 and 139.16 $m^2/g$, respectively. Additionally, RFG4-AC, RFG5-AC, RFG7-AC, and RFG8-AC show two main peaks at 0.7 and 1.1 nm. The corresponding incremental pore areas of RFG4-AC, RFG5-AC, RFG7-AC, and RFG8-AC at 0.7 nm are 114.31, 20.0, 17.46, and 99.66 $m^2/g$, respectively. Further, the corresponding incremental pore areas of RFG4-AC, RFG5-AC, RFG7-AC, and RFG8-AC at 1.1 nm are 93.73, 114, 156.05, and 109.65 $m^2/g$, respectively. In addition, RFG2-AC shows two main peaks at 0.8 and 1.1 nm for the corresponding incremental pore areas of 13.02 and 76.20 $m^2/g$, respectively. RFG6-AC exhibits three main peaks at 0.8, 1.0 and 1.2 nm for the corresponding incremental pore areas of 42.59, 106.68 and 72.56 $m^2/g$, respectively. RFG1-AC shows two main peaks of 1.1 and 1.2 nm for the corresponding incremental pore areas of 98.41 and 67.47 $m^2/g$, respectively. The average pore size of RFGn samples ranged from 3.5 to 62.9 nm, in which RFG3 and RFG8 represent the lowest and the highest average pore sizes, respectively. Other related details of average pore sizes are listed in Table 2.

The micropores range from 0 to 1.21(%), which correspond to the samples RFG2 and RFG1 as lowest and highest percentages of micropores. The mesopores of RFGn samples range from 11.21 to 32.89(%) for the samples of RFG4 and RFG3, which represent the lowest and the highest mesopore percentages. Further, the percentage of macropores of RFGn samples ranges from 61.07 to 88.50(%) for RFG7, and RFG9, which represent the lowest and highest macropore percentages. Furthermore, the amount of $N_2$ gas adsorption on RFGn samples ranges from ~0.01 to 17.70 mmol/g where the lowest and highest values correspond to RFG9 and RFG6, respectively (see Table 2a). Also, the amount of $N_2$ gas adsorption on RFGn-AC samples ranges from ~2.64 to 11.97 mmol/g where the lowest and highest values correspond to RFG2-AC and RFG3-AC, respectively (see Table 2b).

Figure 7A:
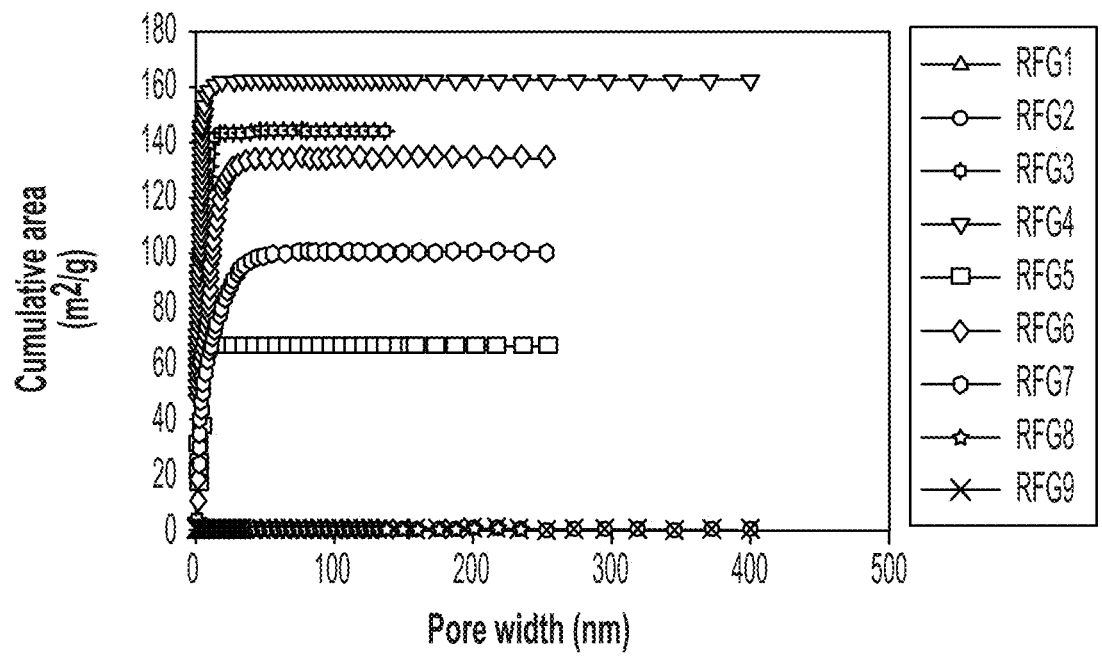
FIG. 7(a) illustrates cumulative pore surface area versus pore width of RFGn samples, according to certain embodiments.
Figure 7B:
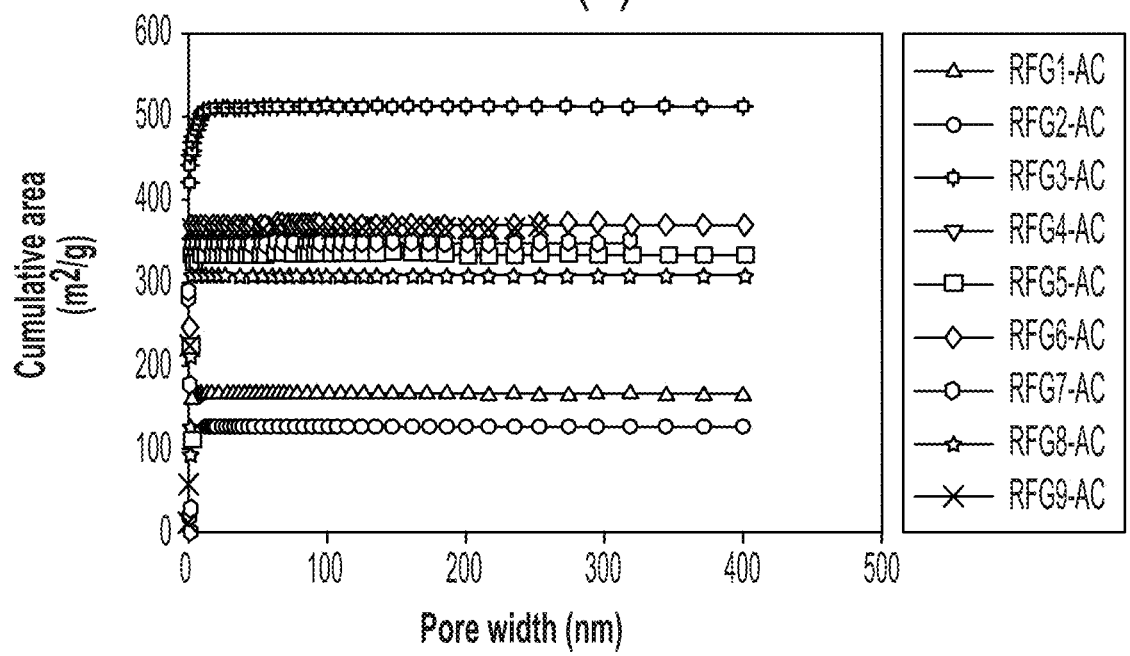
FIG. 7(b) illustrates cumulative pore surface area versus pore width of RFGn-AC samples, according to certain embodiments.

FIG. 7(a) illustrates cumulative pore area versus pore width of RFGn samples, according to certain embodiments. Further, FIG. 7(b) illustrates cumulative pore area versus pore width of RFGn-AC samples, according to certain embodiments. As illustrated in FIG. 7(a), the cumulative pore area of RFG1 is 0.01 $m^2/g$, which represents the lowest cumulative pore area, and that of RFG4 is 176.15 $m^2/g$, which represents the highest cumulative pore area. Moreover, the sequence order of RFGn samples are RFG4>RFG6>RFG3>RFG7>RFG5>RFG8>RFG9>RFG2>RFG1. In addition, the increment trend between cumulative pore area and pore width is noticeable in case of RFG3, RFG4, RFG5, RFG6, RFG7, and RFG8 whereas a weak trend of cumulative pore areas are in case of RFG1, RFG2, RFG8, and RFG9. Further, the cumulative pore areas increase by increasing pore width of RFG3, RFG4 and RFG5 up to 12.65 nm then level off at the corresponding cumulative areas of 145.40, 176.15, and 67.48 $m^2/g$, respectively. RFG6 shows increasing up to 25.25 nm then levels off for the corresponding cumulative pore area of 147.66 $m^2/g$. Further, RFG7 exposes increasing up to 34.33 nm then levels off for the corresponding cumulative pore area of 118.26 $m^2/g$. More details of surface area of these RFG samples are listed in Table 2.

As illustrated in FIG. 7(b), the cumulative pore area of RFGn-AC samples ranges from 160.92 to 511.46 $m^2/g$, and the corresponding cumulative pore areas are for RFG2-AC and RFG3-AC, respectively. In addition, the sequence of order is RFG3>RFG1>RFG8>RFG5>RFG7>RFG9>RFG4>RFG6>RFG3. Generally, the cumulative pore area of RFG-AC samples may increase by increasing the pore width. Further, the increment of cumulative pore area may be up to a pore width of 8.63 nm then levels off for the samples of RFG3 and RFG6 of 511.46 and 370.81 $m^2/g$, respectively. The cumulative pore area of RFG1, RFG2, RFG4, RFG5, RFG7, RFG8, and RFG9 may increase up to 1.17 nm then levels off, and the corresponding cumulative pore areas of 165.92, 160.92, 368.89, 333.31, 356.26, 308.49, and 368.51 m²/g. Other related details are listed in Table 2.

Additionally, from FIGS. 7(a) and 7(b), the average pore width of RFGn-AC samples ranges from 0.87 to ~2 nm, which represent the lowest and highest average pore width of RFG9-AC and RFG7-AC, respectively. Moreover, the percentage of micropore of RFGn-AC samples ranged from 0.3 to 0.6%, and the percentage of mesopores of RFGn-AC ranges from 11.2 to 19.3% and the percentage of macropores ranges from 81.7 to 88.5%. Other related details of micro-, meso- and macropores are listed in Table 2.

Figure 8A:
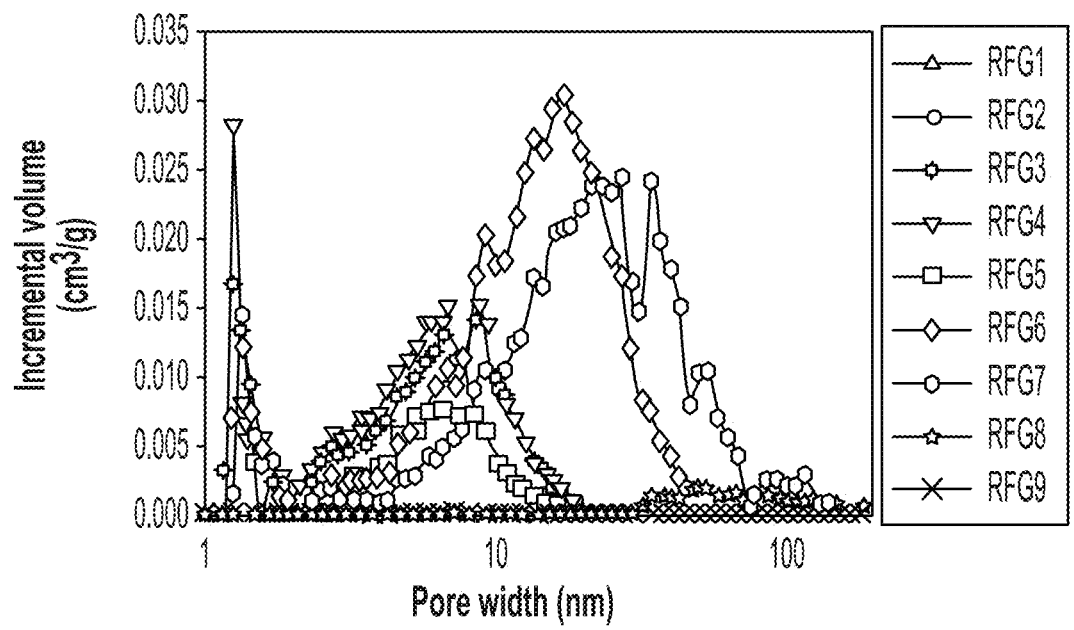
FIG. 8(a) illustrates incremental pore volume versus pore width of RFGn samples, according to certain embodiments.
Figure 8B:
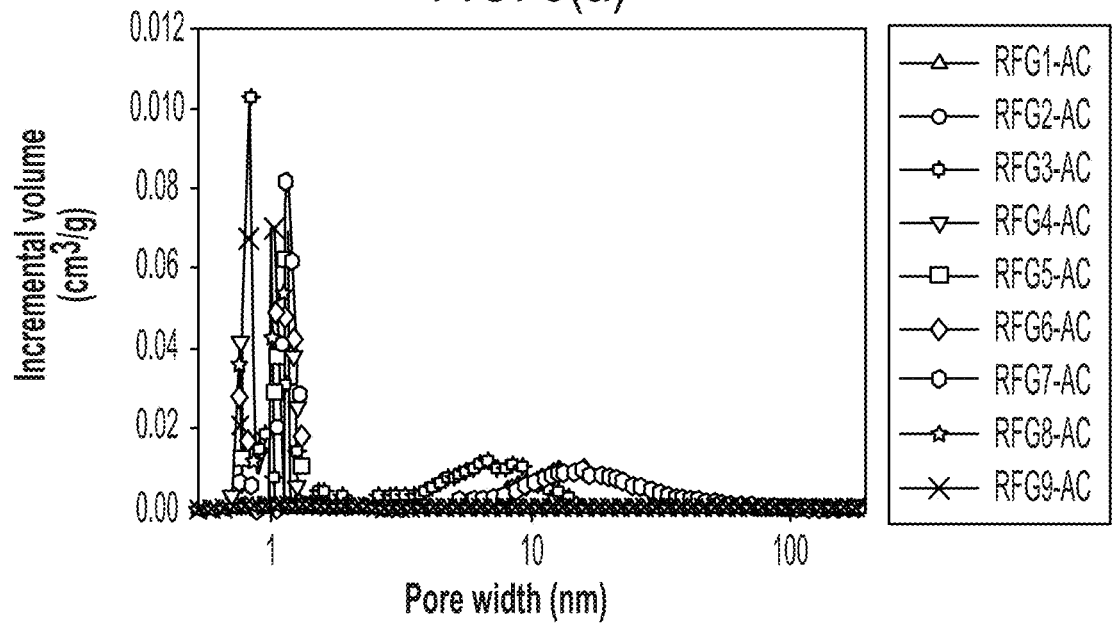
FIG. 8(b) illustrates incremental pore volume versus pore width of RFGn-AC samples, according to certain embodiments.

FIG. 8(a) illustrates incremental pore volume versus pore width of RFGn samples, according to certain embodiments. Further, FIG. 8(b) illustrates incremental pore volume versus pore width of RFGn-AC samples, according to certain embodiments. In certain embodiments, RFGn samples may include RFG1, RFG2, RFG3, RFG4, RFG5, RFG6, RFG7, RFG8, and RFG9. Further, RFGn-AC samples may include RFG1-AC, RFG2-AC, RFG3-AC, RFG4-AC, RFG5-AC, RFG6-AC, RFG7-AC, RFG8-AC, and RFG9-AC. As illustrated in FIG. 8(a), RFG4 shows three main peaks at 1.3, 6.8, and 8.6 nm with corresponding incremental pore volumes of 0.028, 0.015, and 0.015 cm³/g, respectively. Further, RFG3 contains three main peaks at 1.3, 6.8, and 8.6 nm but with corresponding incremental pore volumes of 0.016, 0.013, and 0.014 cm³/g, respectively. Additionally, RFG7 exposes five main peaks at 1.4, 27.3, 34.3, 54.4, and 117.2 nm with the corresponding incremental pore volumes of 0.014, 0.024, 0.025, 0.010, and 0.003 cm³/g, respectively. Further, RFG6 exhibits two main peaks at 1.4 and 17.2 nm with the corresponding incremental pore volumes of 0.012 and 0.031 cm³/g, respectively. In addition, RFG5 has two main peaks at 1.4 and 6.8 nm with the corresponding incremental pore volumes of 0.012 and 0.008 cm³/g, respectively. Moreover, the trends in RFG1, RFG2, RFG8, and RFG9 may be weak and slightly unnoticeable near zero. In certain embodiments, these differences in incremental pore volumes may be due to the differences in the molar ratios of resorcinol and formaldehyde during the synthesis process.

As illustrated in FIG. 8(b), RFG3-AC shows four main peaks at 0.8, 1.1, 6.3, and 8.6 nm with the corresponding incremental pore volumes of 0.103, 0.031, 0.011, and 0.010 cm³/g, respectively. RFG9-AC exhibits two main peaks at 0.8 and 1.0 nm with the corresponding incremental pore volumes of 0.067 and 0.071 cm³/g, respectively. In addition, RFG4-AC exposes two main peaks at 0.7 and 1.1 nm with the corresponding incremental pore volumes of 0.041 and 0.005 cm³/g, respectively. Further, two main peaks characterize RFG8-AC at 0.7 and 1.1 nm with the corresponding incremental pore volumes of 0.037 and 0.058 cm³/g, respectively. Additionally, RFG5-AC exhibits two main peaks at 0.7 and 1.1 nm with the corresponding incremental pore volumes of 0.008 and 0.006 cm³/g, respectively. RFG1-AC shows one main peak at 1.1 nm with an incremental pore volume of 0.054 cm³/g; and RFG6-AC exposes three main peaks at 0.8, 1.1 and 14.4 nm with the corresponding incremental pore volumes of 0.017, 0.055, and 0.012 cm³/g, respectively. RFG7-AC indicates to three main peaks at 0.7, 1.1, and 14.8 nm with corresponding incremental pore volumes of 0.006, 0.082, and 0.009 cm³/g, respectively.

Further, RFG2-AC shows two main peaks at 0.8 and 1.1 nm with the corresponding incremental pore volumes of 0.004 and 0.042 cm³/g, respectively. These differences in incremental pore volumes may be due the differences in the molar ratios of resorcinol and formaldehyde during the in-situ synthesis process.

Figure 9A:
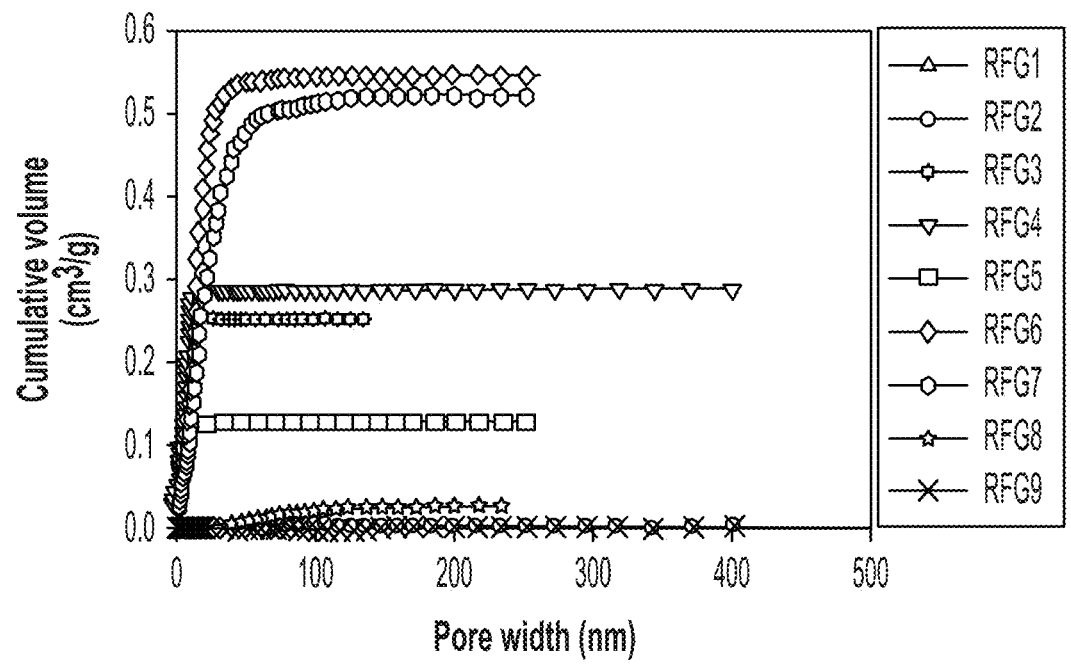
FIG. 9(a) illustrates cumulative pore volume versus pore width of RFGn samples, according to certain embodiments.
Figure 9B:
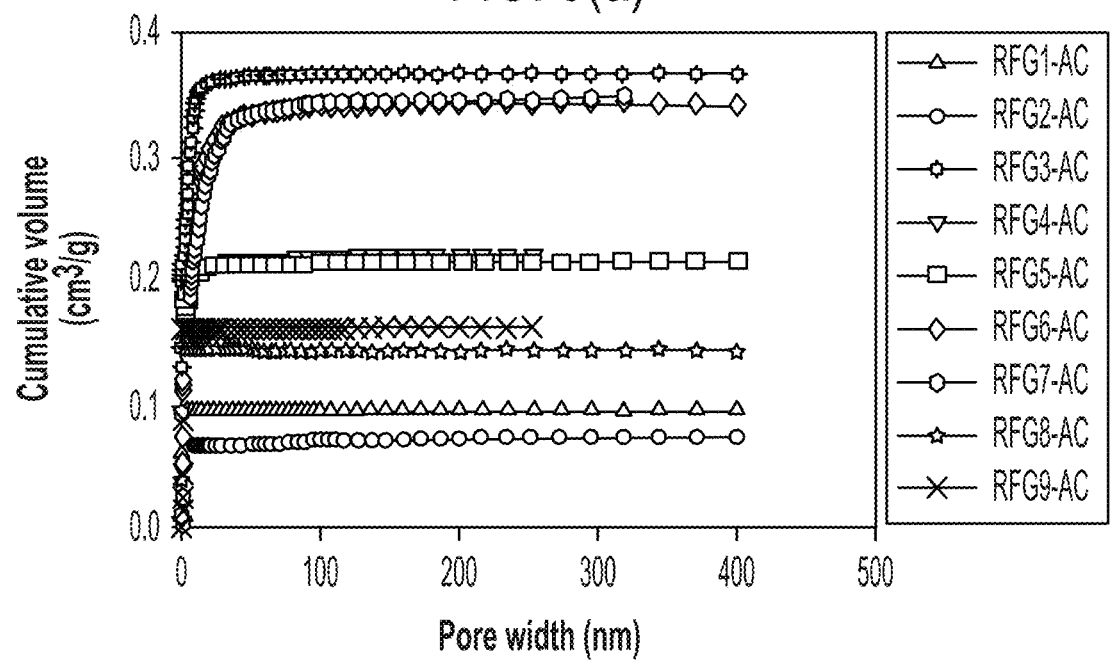
FIG. 9(b) illustrates cumulative pore volume versus pore width of RFGn-AC samples, according to certain embodiments.

FIG. 9(a) illustrates cumulative pore volumes versus pore width of RFGn samples, according to certain embodiments. Further, FIG. 9(b) illustrates cumulative pore volumes versus pore width of RFGn-AC samples, according to certain embodiments. As illustrated in FIG. 9(a), by increasing the pore width, the cumulative pore volume increases. In addition, the lowest cumulative pore volume of $4 \times 10^{-4}$ cm³/g is for RFG1, and the highest cumulative pore volume of 0.546 cm³/g is for RFG6. Further, the order of sequence of cumulative volumes of RFGn samples may be RFG6>RFG7>RFG4>RFG3>RFG5>RFG8>RFG2>RFG9>RFG1. The corresponding pore widths of RFG6, RFG7, RFG4, RFG3, RFG5, RFG8, RFG2, RFG9 and RFG1 are 54.41, 108.56, 13.67, 12.65, 10.06, 108.56, 1.27, 1.17 and 1.10 nm, respectively; and the corresponding total pore volumes of these samples are 0.546, 0.522, 0.292, 252, 0.127, 0.028, 0.0043, 0.0014, and 0.0004 cm³/g, orderly. Other related details of total pore volume are listed in Table 2.

As illustrated in FIG. 9(b), by increasing pore width, the cumulative pore volume of RFGn-AC samples may increase. In addition, the sequential order of cumulative pore volumes for these RFG-AC samples may be RFG3-AC>RFG7-AC>RFG6-AC>RFG4-AC>RFG5-AC>RFG9-AC>RFG8-AC>RFG1-AC>RFG2-AC. Moreover, RFG2-AC and RFG3-AC represent the lowest and the highest cumulative pore volumes among samples, which equal 0.086 and 0.366 cm³/g, respectively. Further, the cumulative pore volumes of RFG3-AC, RFG6-AC RFG7-AC, RFG4-AC, RFG5-AC, RFG9-AC-AC, RFG8-AC, RFG1-AC, and RFG2-AC may increase with increasing pore width up to 17.21, 40.03, 73.69, 13.67, 10.06, 0.5, 0.5, 0.5, and 0.5 nm, respectively; then level off for the corresponding total pore volumes of 0.366, 0.342, 0.348, 0.220, 0.215, 0.162, 0.150, 0.094, and 0.086 cm³/g, respectively; as listed in Table 2.

Figure 10:
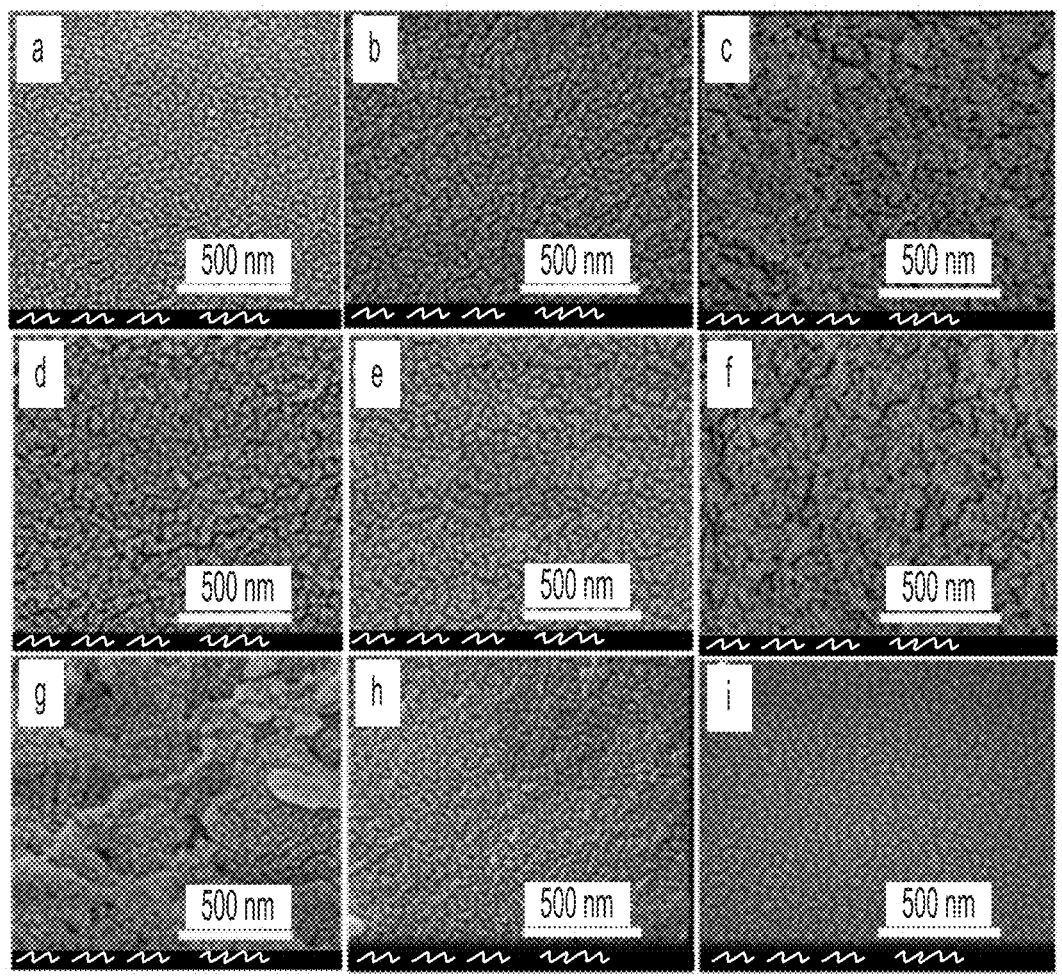
FIG. 10 illustrates NanoSEM photomicrographs of (a) RFG1, (b) RFG2, (c) RFG3, (d) RFG4, (e) RFG5, (f) RFG6, (g) RFG7, (h) RFG8, and (i) RFG9 samples, according to certain embodiments.

FIG. 10 illustrates NanoSEM photomicrographs of (a) RFG1, (b) RFG2, (c) RFG3, (d) RFG4, (e) RFG5, (f) RFG6, (g) RFG7, (h) RFG8, and (i) RFG9 samples, according to certain embodiments. As illustrated in FIG. 10(a-i), the overall morphological shapes of RFGn samples are all similar to an extent at this amplification scale (their difference may become more noticeable in larger amplifications via using anyhow or using cross-section investigation); where they show a particulate feature with particle sizes ranging from 32.8 to 42.5 nm. In addition, the overall trend of particle sizes is almost decreasing with increasing ratio of formaldehyde feeding.

Figure 11:
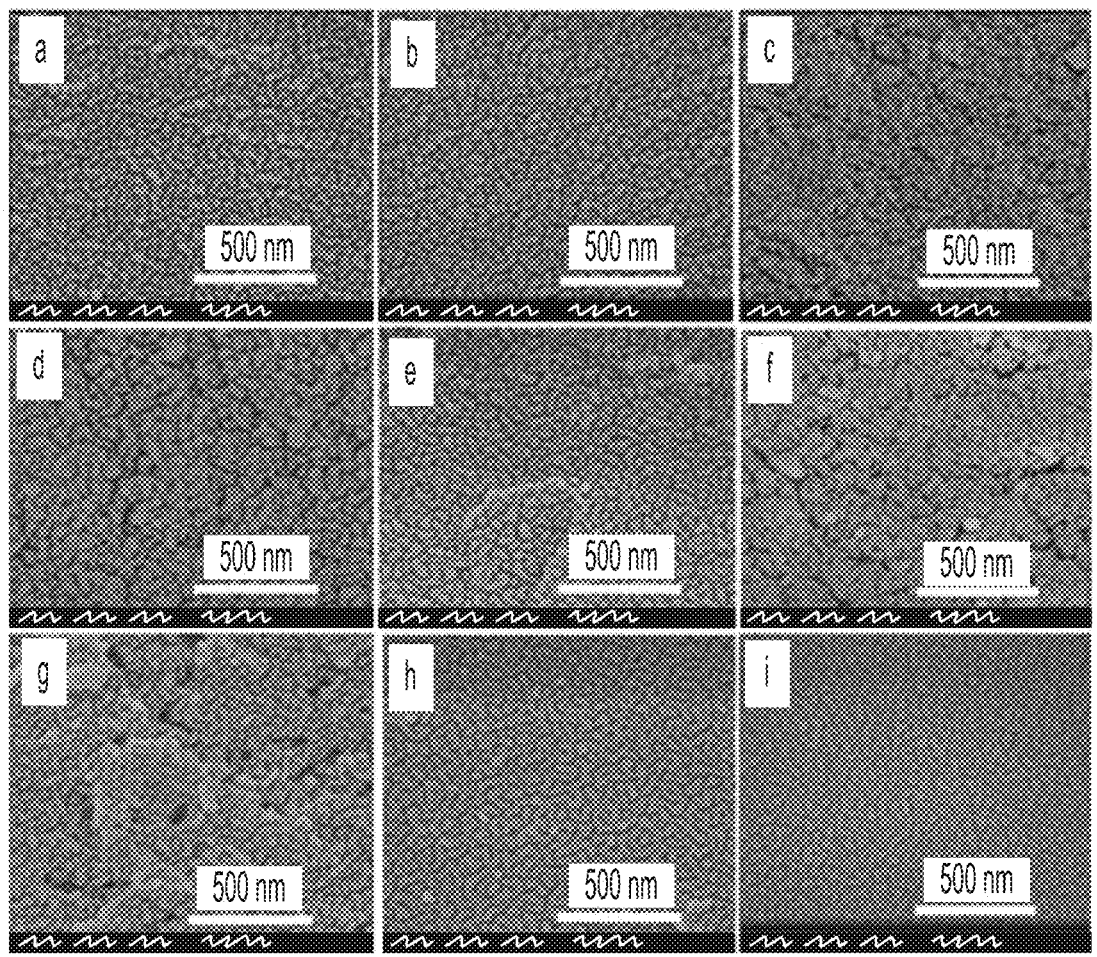
FIG. 11 illustrates NanoSEM photomicrographs of (a) RFG1-AC, (b) RFG2-AC, (c) RFG3-AC, (d) RFG4-AC, (e) RFG5-AC, (f) RFG6-AC, (g) RFG7-AC, (h) RFG8-AC, and (i) RFG9-AC samples, according to certain embodiments.

FIG. 11 illustrates NanoSEM photomicrographs of (a) RFG1-AC, (b) RFG2-AC, (c) RFG3-AC, (d) RFG4-AC, (e) RFG5-AC, (f) RFG6-AC, (g) RFG7-AC, (h) RFG8-AC, and (i) RFG9-AC samples, according to certain embodiments. From the overall observation of RFGn-AC morphologies in FIG. 11(a-i), it can be deduced that the morphological shapes are almost similar to each other at this amplification scale (their difference may become more noticeable in larger amplification via using anyhow or using cross-section investigation). In addition, all samples show a particulate feature with particle sizes ranging from 35.5 to 48.5 nm. Further, the overall trend of particle sizes in FIG. 11(a-i) is almost decreasing with increasing feeding concentration of formaldehyde.

Figure 12:
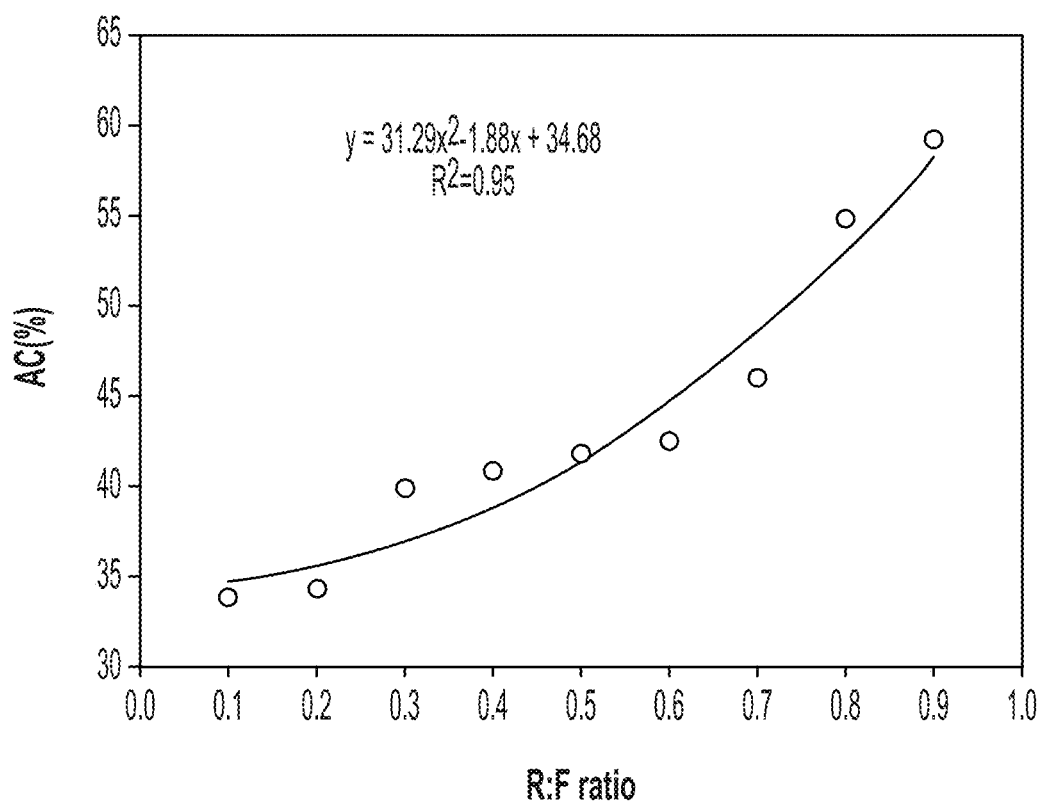
FIG. 12 illustrates the percentage of activated carbon mass (AC, %) relative to the virgin gel mass, according to certain embodiments.

FIG. 12 illustrates the percentage of activated carbon (AC, %), according to certain embodiments. In particular, FIG. 12 illustrates the percentage of activated carbon calculated from the following equation:

$$AC\ (\%) = \left(\frac{W_{Carbon}}{W_{Gel}}\right) \times 100\%,$$

where $W_{Carbon}$ and $W_{Gel}$ refer to the weight of activated carbon and dry gels, respectively.

As illustrated in FIG. 12, there is a strong relationship between the sample feeding composition and percentage of outcome activated carbon (AC, %). For instance, the AC (%) of RFGn-AC samples ranges from 33.77 to 59.16%, whereas the 59.16% belongs to RFG1-AC and 33.77% is assignable to RFG9-AC. By referring to Table 1, it can be shown that as the R:F ratio decreases (namely, increasing formaldehyde concentration into the in-situ feeding solution), the AC (%) also decreases. Therefore, this difference in AC (%) may be due to the in-situ molar ratio of resorcinol to formaldehyde in the synthesis process.

Figure 13A:
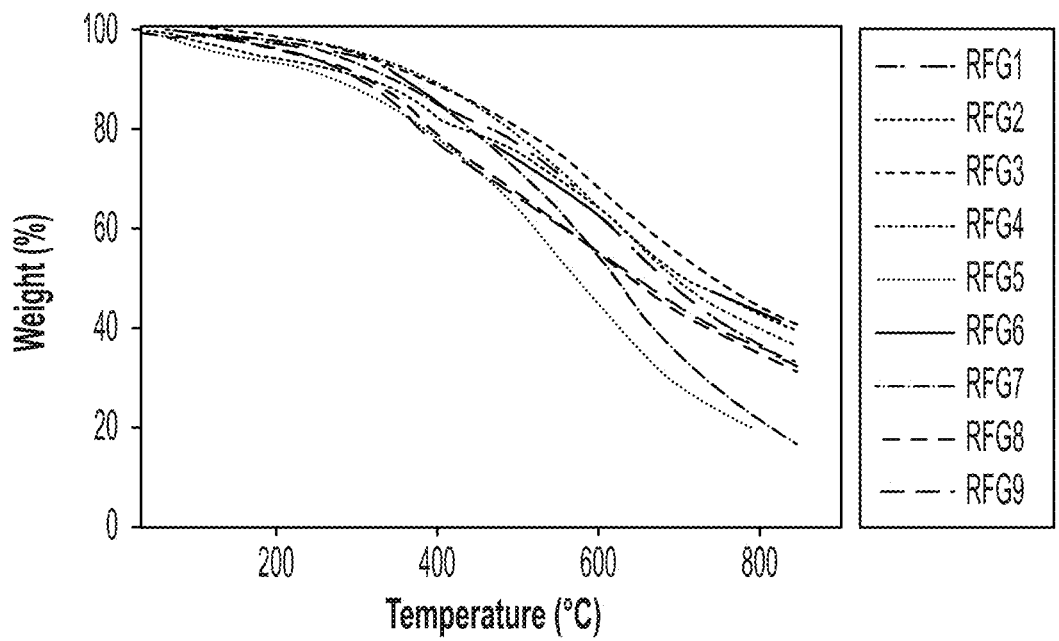
FIG. 13(a) illustrates thermogravimetric analysis (TGA) thermograms of RFGn samples, according to certain embodiments.
Figure 13B:
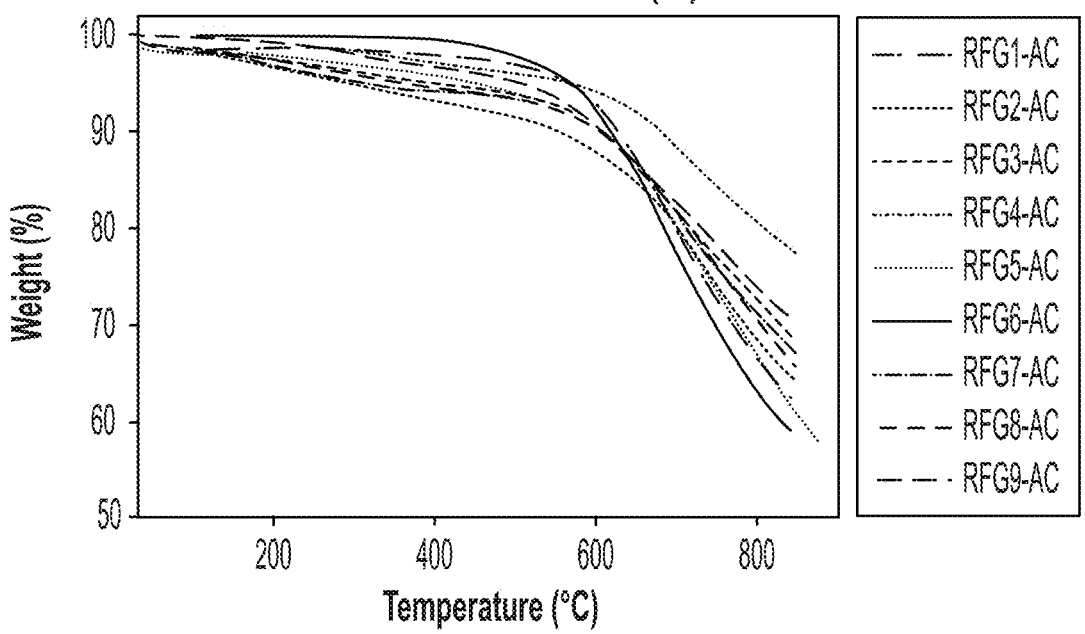
FIG. 13(b) illustrates TGA thermograms of RFGn-AC samples, according to certain embodiments.

FIG. 13(a) illustrates TGA thermograms of RFGn samples, according to certain embodiments. Further, FIG. 13(b) illustrates TGA thermograms of RFGn-AC samples, according to certain embodiments. The TGA thermograms of FIGS. 13(a) and 13(b) are from room temperature up to 850° C. As it can be seen from these figures, the thermal stability of RFGn-AC samples is higher than that of RFGn samples at the same corresponding temperatures. The corresponding decomposition values (i.e., weight loss %) of RFGn and RFGn-AC samples at different temperatures are also listed in Table 3a and Table 3b, respectively. It can be observed from Table 3a that the lowest and the highest thermal decomposition percentages of RFGn samples at 150° C. are 0 and 4.94% for RFG3 an RGF5, respectively. The lowest and the highest weight losses among RFGn samples at 200° C. are 1.26 and 6.72% for RFG6 and RFG5, respectively. The lowest and the highest weight losses among RFG samples at 300° C. are 3.69 and 11.59% for RFG5 and RFG1, respectively. Further, the lowest and the highest weight losses among RFG samples at 400° C. are 10.63 and 22.63% for RFG4 and RFG9, respectively, and the lowest and the highest weight losses among RFGn samples at 500° C. are 19.34 and 36.15% for the corresponding RFG3 and RFG5, respectively. In addition, the lowest and the highest weight losses among RFGn samples at 600° C. are 31.83 and 55.22% for RFG3 and RFG5, respectively. Additionally, the lowest and the highest weight losses among RFGn samples at 700° C. are 45.09 and 71.26% for RFG3 and RFG5, respectively, and at 800° C. are 55.16 and 80.25% for RFG3 and RFG5, respectively.

TABLE 3a

TGA thermal decomposition of RFGn samples.

| | Weight loss (%) Temperature (° C.) | | | | | | | |
|---|---|---|---|---|---|---|---|---|
| Sample | 150° C. | 200° C. | 300° C. | 400° C. | 500° C. | 600° C. | 700° C. | 800° C. |
| RFG1 | 1.95 | 3.05 | 11.59 | 15.23 | 22.92 | 36.64 | 52.73 | 63.46 |
| RFG2 | 4.13 | 5.42 | 5.49 | 17.55 | 24.79 | 36.07 | 48.85 | 57.30 |
| RFG3 | 0.00 | 1.30 | 3.93 | 11.18 | 19.34 | 31.83 | 45.09 | 55.16 |
| RFG4 | 0.67 | 1.36 | 4.76 | 10.63 | 20.83 | 36.07 | 50.70 | 59.93 |
| RFG5 | 4.94 | 6.72 | 3.69 | 21.59 | 36.15 | 55.22 | 71.26 | 80.25 |
| RFG6 | 0.84 | 1.26 | 5.40 | 14.69 | 25.73 | 37.49 | 49.12 | 56.30 |
| RFG7 | 1.16 | 1.66 | 6.59 | 15.21 | 27.63 | 45.88 | 65.16 | 78.39 |
| RFG8 | 2.40 | 3.65 | 8.96 | 20.70 | 32.78 | 44.97 | 56.62 | 64.98 |
| RFG9 | 2.05 | 3.12 | 9.64 | 22.63 | 33.30 | 44.62 | 55.73 | 63.59 |

As shown in Table 3b, the lowest and the highest weight losses (%) of RFGn-AC samples at 150° C. are 0 and 4.46% for RFG6-AC and RFG9-AC, respectively. In addition, the lowest and the highest weight at 200° C. are 0 and 3.29% for RFG6-AC and RFG2-AC, respectively. Further, the lowest and the highest weight losses at 300° C. are 0 and 5.00% for RFG6-AC and RFG2-AC, respectively, and the lowest and the highest weight at 400° C. are 0.62 and 6.79% for RFG6-AC and RFG2-AC, respectively. Additionally, the lowest and the highest weight losses at 500° C. are 1.95 and 8.46% for RFG6-AC and RFG2-AC, respectively, and the lowest and the highest weight losses at 600° C. are 5.76 and 11.77% for RFG4-AC and RFG2-AC, respectively. The lowest and the highest weight losses at 700° C. are 11.52 and 22.21% for RFG4-AC and RFG6-AC, respectively. Further, the lowest and the highest weight losses at 800° C. are 19.28 and 36.41% for RFG4-AC and RFG6-AC, respectively.

TABLE 3b

TGA thermal decomposition of RFGn-AC samples

| | Weight loss (%) Temperature (° C.) | | | | | | | |
|---|---|---|---|---|---|---|---|---|
| Sample | 150° C. | 200° C. | 300° C. | 400° C. | 500° C. | 600° C. | 700° C. | 800° C. |
| RFG1-AC | 1.35 | 1.32 | 1.52 | 2.09 | 2.94 | 7.10 | 19.85 | 33.05 |
| RFG2-AC | 2.61 | 3.29 | 5.00 | 6.79 | 8.46 | 11.77 | 20.15 | 31.10 |

TABLE 3b-continued

TGA thermal decomposition of RFGn-AC samples

| Sample | Weight loss (%) Temperature (° C.) | | | | | | | |
|---|---|---|---|---|---|---|---|---|
| | 150° C. | 200° C. | 300° C. | 400° C. | 500° C. | 600° C. | 700° C. | 800° C. |
| RFG3-AC | 2.12 | 2.60 | 3.68 | 4.98 | 6.01 | 9.08 | 17.88 | 27.57 |
| RFG4-AC | 0.77 | 1.12 | 1.98 | 3.14 | 3.88 | 5.76 | 11.52 | 19.28 |
| RFG5-AC | 1.96 | 2.20 | 3.01 | 4.24 | 5.86 | 9.08 | 18.85 | 32.69 |
| RFG6-AC | 0.00 | 0.00 | 0.00 | 0.62 | 1.95 | 7.72 | 22.21 | 36.41 |
| RFG7-AC | 2.41 | 3.19 | 4.58 | 5.76 | 6.70 | 9.37 | 18.00 | 28.63 |
| RFG8-AC | 2.21 | 2.69 | 3.97 | 5.29 | 6.61 | 9.81 | 18.00 | 29.27 |
| RFG9-AC | 4.46 | 0.92 | 1.99 | 3.21 | 4.86 | 9.21 | 17.22 | 25.99 |

Figure 14:
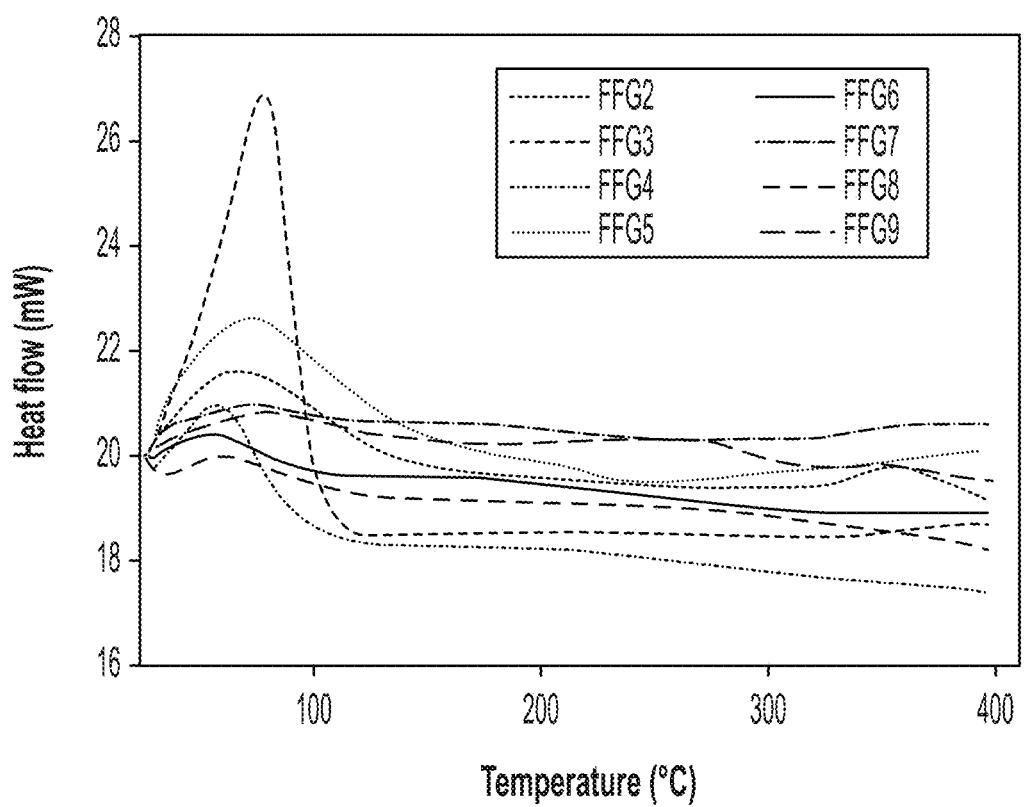
FIG. 14 illustrates differential scanning calorimetry (DSC) thermograms of RFGn samples, according to certain embodiments.

FIG. 14 illustrates DSC thermograms of RFGn samples, according to certain embodiments. As illustrated in FIG. 14, the heat flows of RFG2, RFG3, RFG4, RFG5, RFG6, RFG7, RFG8, and RFG9 are 21.64, 26.92, 20.40, 22.60, 20.93, 21.01, 19.93, and 20.82 mW, respectively; at the corresponding temperatures of 65.65, 78.20, 54.11, 67.25, 56.31, 69.98, 56.83, and 80.31° C., respectively. Further, the lowest and the highest heat flows are 19.93 and 26.92 mW at 65.65 and 56.83° C. for RFG8 and RFG3, respectively. Overall, the average heat flow of all RFGn samples is about 21.77 mW.

Figure 15:
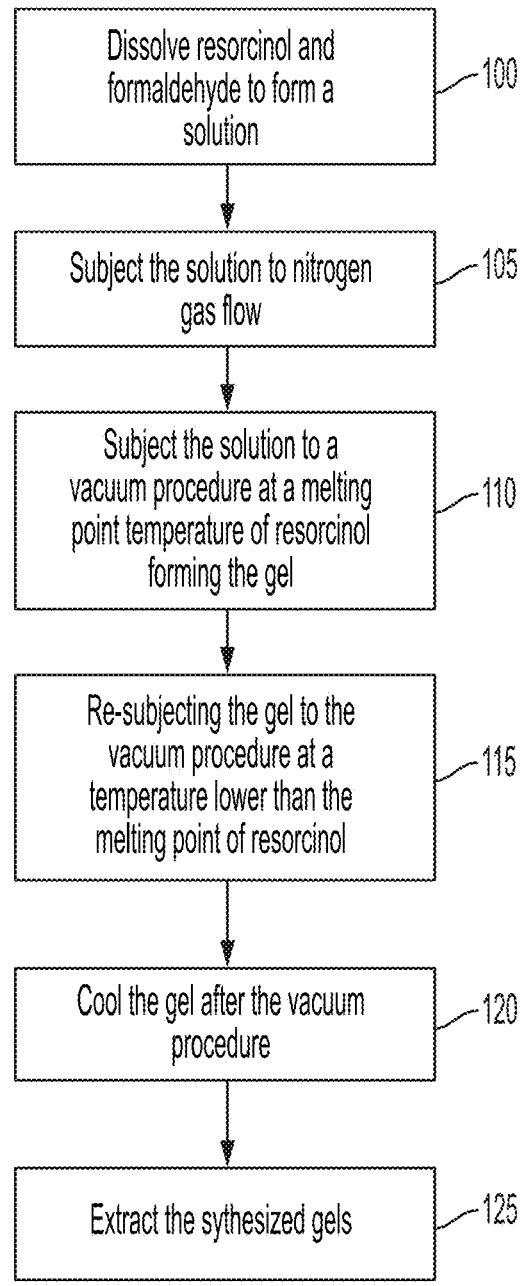
FIG. 15 illustrates a flow diagram of synthesis steps according to certain embodiments.

FIG. 15 illustrates a flow diagram of a method, according to certain embodiments. For instance, the method may be one for synthesizing a gel including, for example, a dry gel. The method may include, at 100, dissolving resorcinol and formaldehyde to form a homogenous solution. The method may also include, at 105, subjecting the solution to nitrogen gas flow (or a flow of another inert gas). The method may further include, at 110, subjecting the solution to a vacuum procedure at a melting point temperature of resorcinol forming the gel. In addition, the method may include, at 115, re-subjecting the gel to the vacuum procedure at a temperature lower than the melting point of resorcinol. Further, the method may include, at 120, cooling the gel after the vacuum procedure. The method may further include at 125, extracting the synthesized gels.

In certain embodiments, the method may also include carbonizing the gel with passing nitrogen gas flow, and activating the gel with passing carbon dioxide gas flow. According to other embodiments, the gels transferred to ceramic boat may then be heated up to 500° C. with heating rate 10° C./minute and kept at this temperature for 3 hours while passing the nitrogen gas in the furnace at a flow rate of 100 cm$^3$/min at 0.3 bar. After that, the carbonized gels may be heated up to 700° C. with heating rate 10° C./min and kept at this temperature for 1 hour while passing carbon dioxide gas with a flow rate of 150 cm$^3$/min at 0.3 bar.

Figure 16:
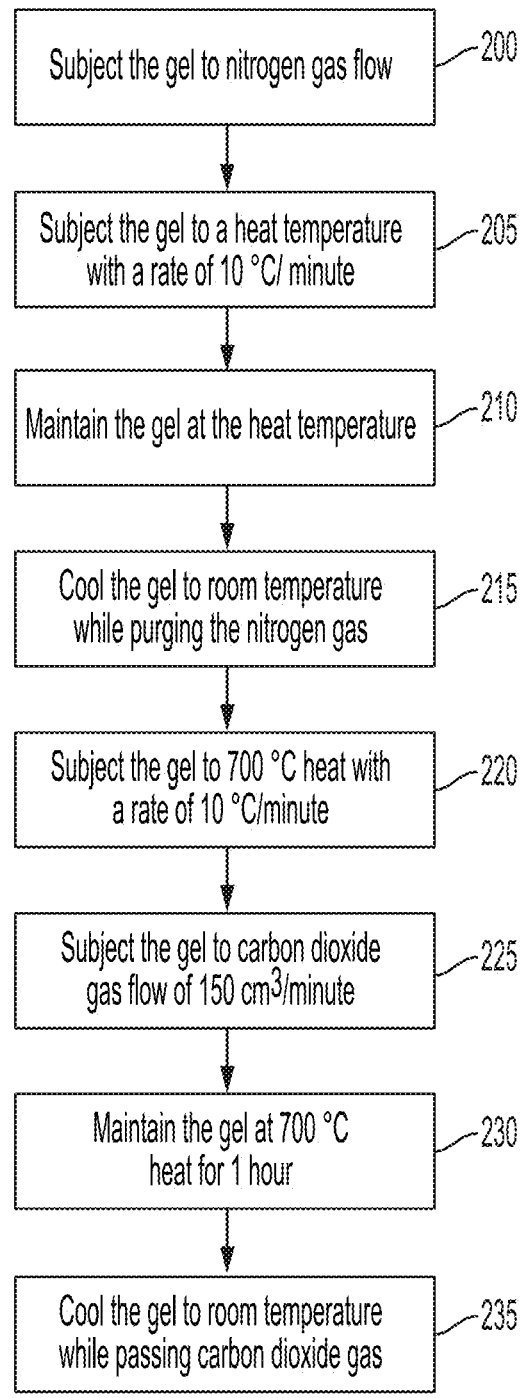
FIG. 16 illustrates a flow diagram of carbonizing and activating steps, according to certain embodiments.

FIG. 16 illustrates a flow diagram of carbonizing and activating steps, according to certain embodiments. The method may include, at 200, subjecting the gel to nitrogen gas flow. The method may also include, at 205, subjecting the gel to a heat temperature with a rate of 10° C./minute. The method may further include, 210, maintaining the gel at the heat temperature. Further, the method may include, at 215, cooling the gel to room temperature while purging the nitrogen gas. The method may further include, at 220, subjecting the gel to 700° C. heat with a rate of 10° C./minute. The method may also include, at 225, subjecting the gel to carbon dioxide gas flow of 150 cm$^3$/minute. In addition, the method may include, at 230, maintaining the gel at 700° C. for 1 hour. Further, the method may include, at 235, cooling the gel to room temperature while passing carbon dioxide gas.

According to certain embodiments, the gel may be subjected to nitrogen gas flow for 40 minutes at room temperature. In other embodiments, the heat temperature may be set to 500° C. In further embodiments, the nitrogen gas flow may be at a rate of 100 cm$^3$/minute. According to certain embodiments, the gel may be maintained at 500° C. for 3 hours.

Certain embodiments described herein provide several technical improvements, enhancements, and/or advantages. In some example embodiments, it may be possible to provide a thermal route of synthesis to produce dry sol-gels (as demonstrated by resorcinol/formaldehyde gels) from different molar ratios of the main reactants without including any additives (e.g., catalysts or buffer solutions or solvents, or initiators). Further, the products synthesized according to certain embodiments are free from residues (due to the absence of additives), which makes them friendlier for the environment. Moreover, this type of synthesis may widen the applications scale of cross-linked gels in different fields that are sensitive and vital to the purity of materials from synthesis residues; such as biomaterials, cosmetics, and pharmaceutics. In addition, certain embodiments may produce gels in much shorter times than the conventional methods with unique properties, which make this method more suitable for mass and easy production. Certain embodiments may also widen the synthesis of other derivatives of resorcinol-formaldehyde gels or other related monomers or related polymers as well. It is noteworthy to mention that this thermal route may be a convenient for synthesis of physical and chemical gels in general.

Certain embodiments may also provide highly pure and clean gels (including their subsequent carbon materials). In addition, certain embodiments may involve much less chemicals, less synthesis steps, easier and more environmental-friendly process than the conventional methods, as it may require only the main reactants (e.g., resorcinol and formaldehyde). Therefore, this thermal route is privileged with reduction of cost and ease of manufacturing and affording the potentials of widening applications in sensitive and vital fields.

Further, as noted herein, certain embodiments may provide an advantageous thermal route of synthesis to produce gels in a fast rate of production without involving extra chemical species or additives. This may then reduce the cost of synthesis and facilitate the manufacturing process on a mass production scale by saving time and efforts, reducing costs, and increasing the production rate.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit, principle, conceptualization, designation and scope of example embodiments.

We claim:

1. A method of synthesizing a gel, comprising:
dissolving resorcinol and formaldehyde to form a solution;
subjecting the solution to nitrogen gas flow;
subjecting the solution to a vacuum procedure at a melting point temperature of resorcinol so as to form the gel;
re-subjecting the gel to the vacuum procedure at a temperature lower than the melting point of resorcinol;
cooling the gel after the vacuum procedure; and
extracting the synthesized gel.

2. The method of synthesizing the gel according to claim 1, further comprising carbonizing the gel with nitrogen gas flow.

3. The method of synthesizing the gel according to claim 2, further comprising activating the gel with carbon dioxide gas flow forming a carbonized gel.

4. The method of synthesizing the gel according to claim 1,
wherein the solution is subjected to nitrogen gas flow in a pressure reactor to create a reaction medium, and
wherein the method further comprises stirring the reaction medium while being subjected to the nitrogen gas flow.

5. The method of synthesizing the gel according to claim 4, further comprising evacuating the reactor at room temperature, and sustaining the reactor for a set amount of time under a vacuum of 0.06 bar.

6. The method of synthesizing the gel according to claim 1, wherein the nitrogen gas flow is applied at a flow rate of 100 $cm^3$/min at 0.3 bar.

7. The method of synthesizing the gel according to claim 1, wherein the temperature of the vacuum procedure is set at 110±2° C. and maintained at that temperature for a set amount of time.

8. The method of synthesizing the gel according to claim 1, wherein the gel is cooled to room temperature.

9. The method of synthesizing the gel according to claim 1, wherein the gel is re-subjected to the vacuum procedure at a temperature of 100±2° C. under evacuation of 0.06 bar for 24 hours.

* * * * *